United States Patent
Izumi et al.

(10) Patent No.: US 6,804,195 B2
(45) Date of Patent: *Oct. 12, 2004

(54) WIRELESS COMMUNICATION SYSTEM HAVING NETWORK CONTROLLER AND WIRELESS COMMUNICATION DEVICE CONNECTED TO DIGITAL COMMUNICATION LINE, AND METHOD OF CONTROLLING SAID SYSTEM

(75) Inventors: Michihiro Izumi, Yokohama (JP); Naoto Kagaya, Yokohama (JP); Shunji Arai, Yokohama (JP); Akihiro Uchimi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,928

(22) Filed: Jan. 12, 1998

(65) Prior Publication Data

US 2002/0044536 A1 Apr. 18, 2002

(30) Foreign Application Priority Data

Jan. 14, 1997 (JP) ............................................. 9-017472
Jul. 24, 1997 (JP) ............................................. 9-214020

(51) Int. Cl.$^7$ .......................... G01R 31/08; H04L 12/16; H04J 3/16
(52) U.S. Cl. ........................ 370/230; 370/264; 370/466
(58) Field of Search ................................. 370/220, 522, 370/524, 465, 347, 451, 433, 466, 467, 493, 480, 468, 401, 349, 328, 329, 338; 455/517, 465, 450, 507, 509, 511

(56) References Cited

U.S. PATENT DOCUMENTS

| | | | | |
|---|---|---|---|---|
| 5,519,702 A | * | 5/1996 | Takahashi | 370/84 |
| 5,591,702 A | * | 1/1997 | Murphy | 510/202 |
| 5,602,837 A | * | 2/1997 | Takahashi | 370/280 |
| 5,757,788 A | * | 5/1998 | Tatsumi et al. | 370/336 |
| 6,018,520 A | * | 1/2000 | Okada | 370/336 |
| 6,028,845 A | * | 2/2000 | Serikawa et al. | 370/249 |

* cited by examiner

Primary Examiner—Duc Ho
(74) Attorney, Agent, or Firm—Morgan & Finnegan, LLP

(57) ABSTRACT

Data communicated on one wireless channel is converted and communicated via a wired line. Alternatively, data communicated on a plurality of wireless channels is bundled and communicated via a wired line using a number of channels smaller than that of the wireless channels. In a case where another wireless communication apparatus wishes to use a wireless communication channel when a plurality of wireless channels are being used for communication, some of the plurality of wireless channels are released, thereby making it possible for the other communication apparatus to perform communication even when communication is being carried out using the plurality of wireless channels. When communication by the other wireless communication apparatus subsequently ends, communication on the original number of wireless channels is resumed.

35 Claims, 34 Drawing Sheets

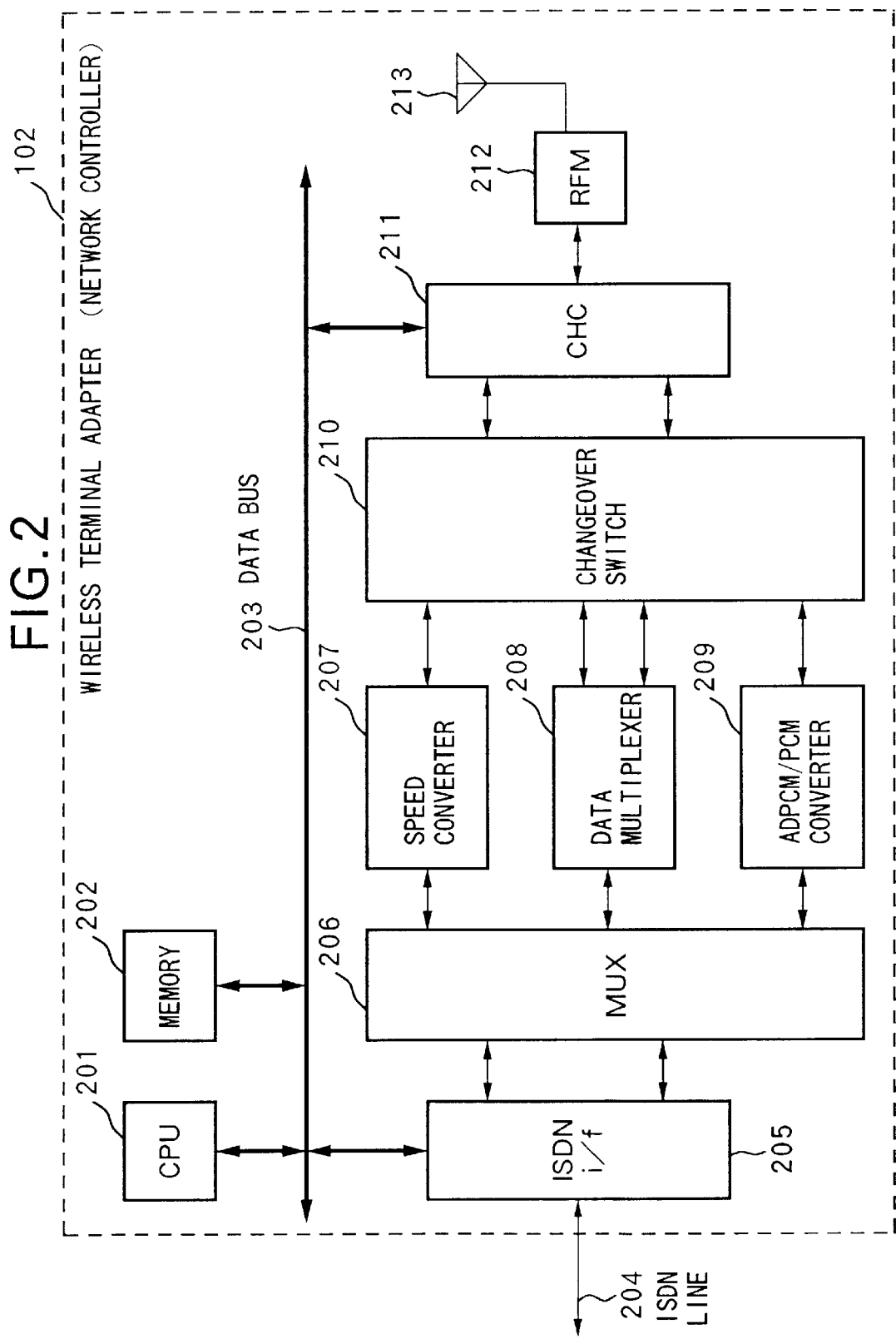

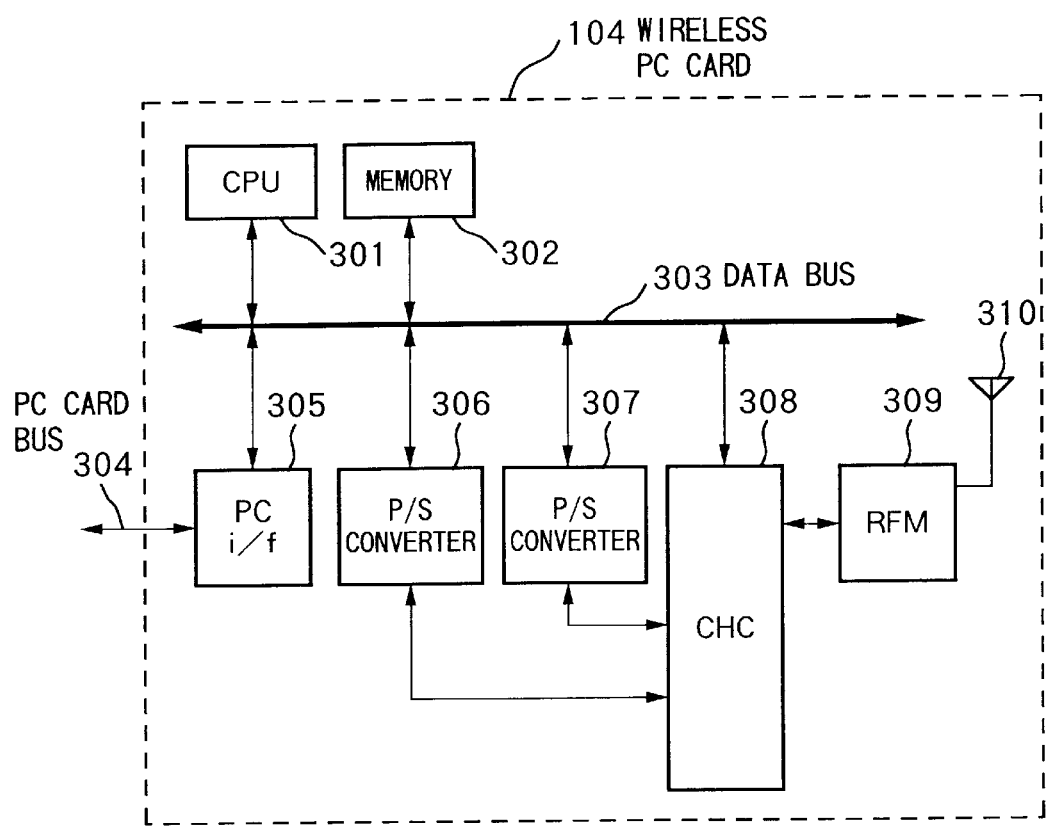

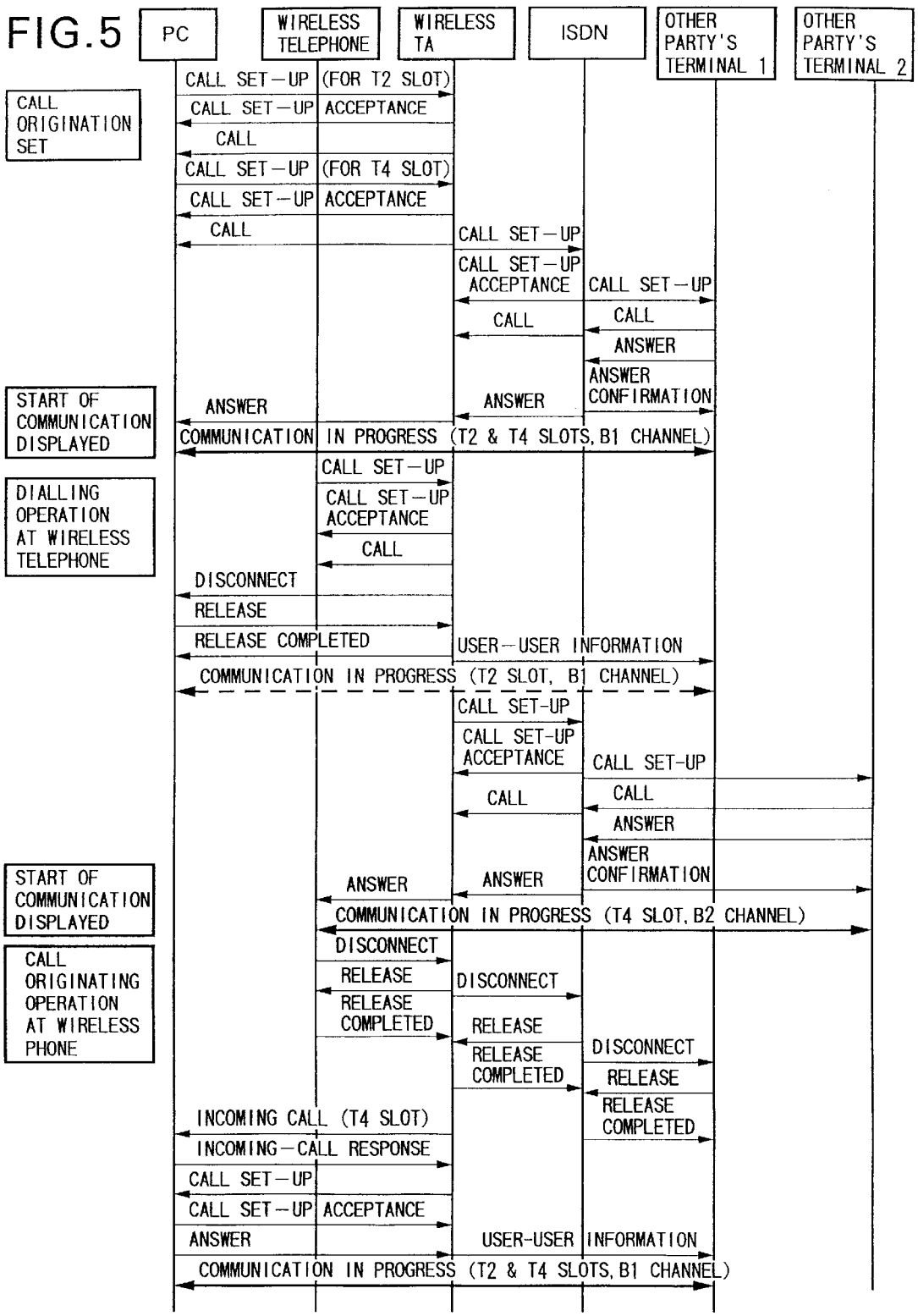

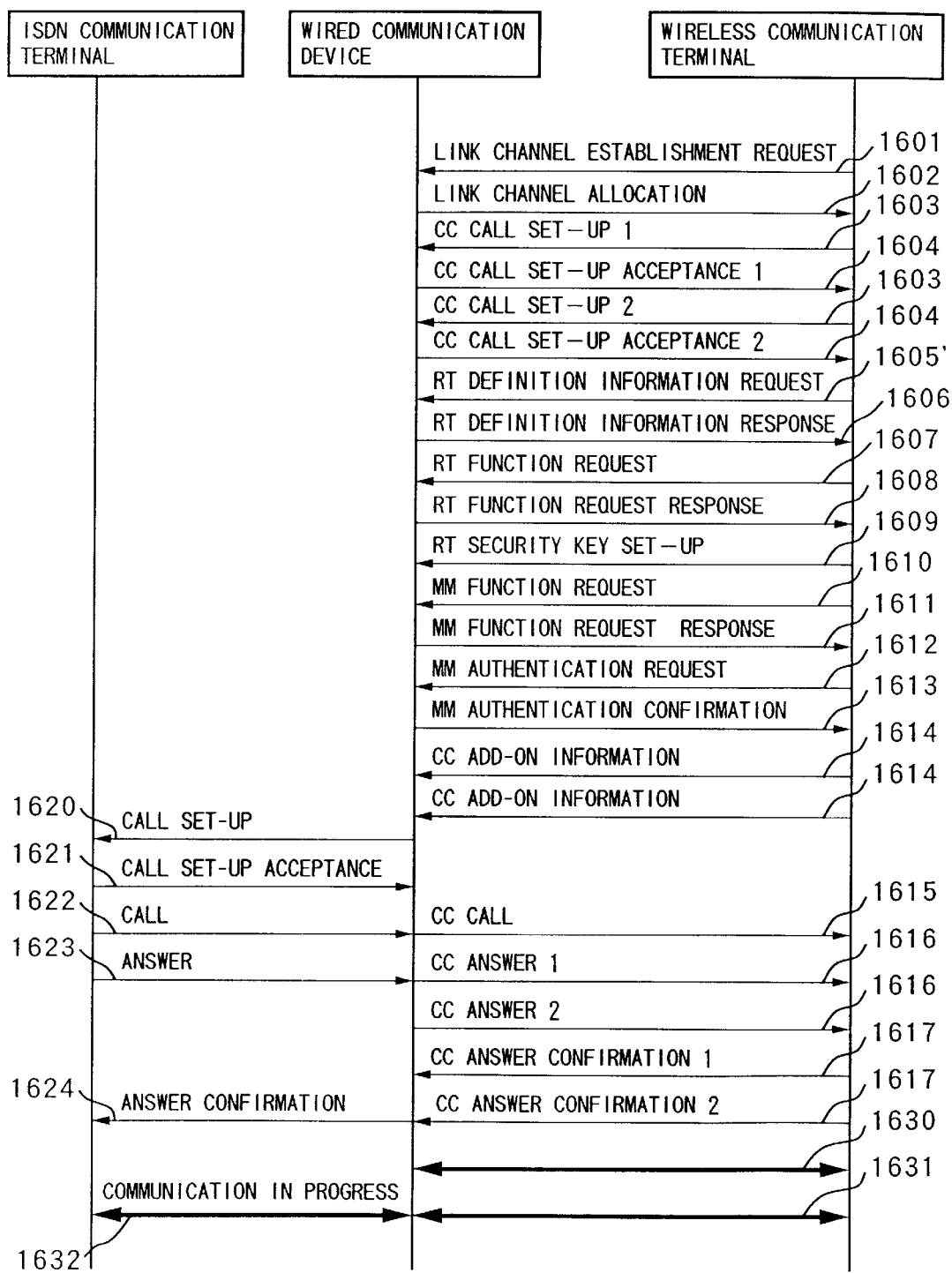

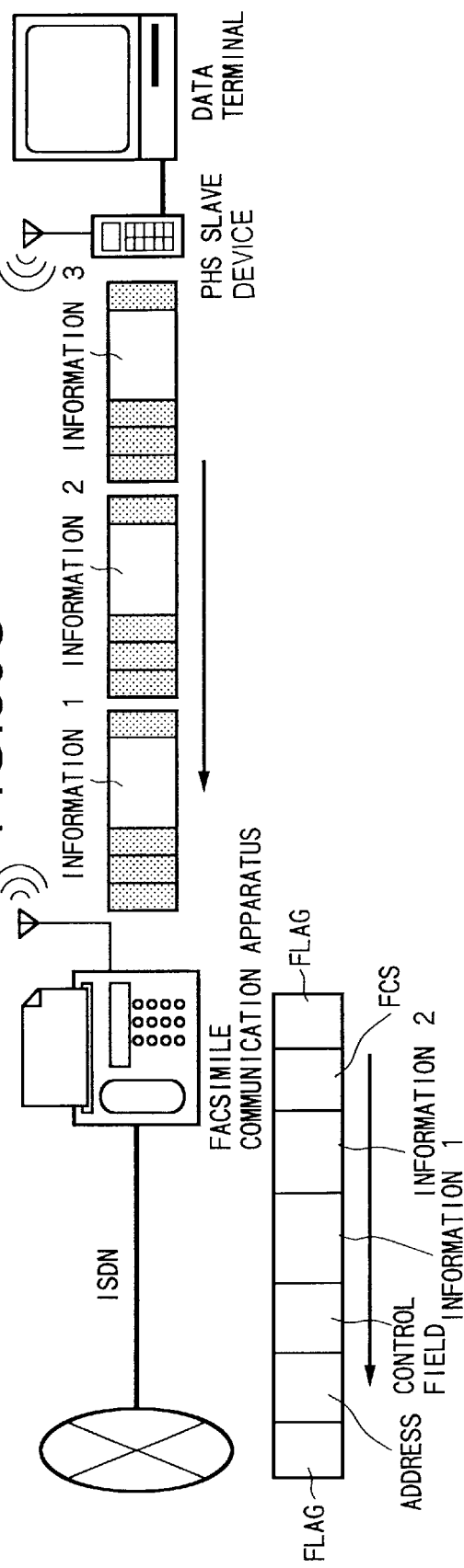

WIRELESS COMMUNICATION SYSTEM HAVING NETWORK CONTROLLER AND WIRELESS COMMUNICATION DEVICE CONNECTED TO DIGITAL COMMUNICATION LINE, AND METHOD OF CONTROLLING SAID SYSTEM

BACKGROUND OF THE INVENTION

1. Field of the Invention

This invention relates to a wireless communication system having a network controller and a wireless communication device connected to a digital communication line, as well as to a method of controlling this system.

2. Description of the Related Art

A system available in the art wirelessly connects a network controller and a wireless communication device, which are connected to an ISDN (Integrated Services Digital Network), by using a digital cordless telephone in accordance with the standard of the PHS (Personal Handyphone System) employed in Japan.

With a system of this kind, two wireless communication devices are capable of communicating using B1 and B2 channels of an ISDN one at a time. For example, one wireless communication device communicates using the B1 channel of the ISDN and the other wireless communication device communicates using the B2 channel of the ISDN.

Though a digital cordless telephone such as one in accordance with the PHS standard communicates using a wireless communication frame in which a plurality of wireless channels are time-division multiplexed, one wireless communication device communicates using one wireless channel. In other words, in a case where connections are made to an ISDN in the manner described above, the data on one wireless channel is communicated using one channel of the ISDN.

However, with PHS, for example, the transmission speed of one wireless channel is 32 kbps while the transmission speed of one channel of the ISDN is 64 kbps. This means that the transmission speed of a 64-kbps ISDN cannot be utilized effectively.

SUMMARY OF THE INVENTION

Accordingly, an object of the present invention is to perform wireless communication utilizing the channels of a wired line effectively.

Another object of the present invention is to perform communication by bundling together the data on two wireless channels and using one channel of a wired line.

A further object of the present invention is to utilize the channels of a wired line effectively without interfering with the wireless communication of another communication device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing a wireless terminal adapter according to the first embodiment;

FIG. 3 is a block diagram of a wireless PC card according to the first embodiment;

FIG. 4 is a diagram showing the format of a time-division multiplexed wireless communication frame used in the first embodiment;

FIG. 5 is a diagram showing a communication sequence of a wireless link and ISDN line according to the first embodiment;

FIG. 16 is a data communication sequence according to the seventh embodiment;

FIGS. 36A–36C are diagrams showing the structure of wireless frames according to the ninth embodiment.

DESCRIPTION OF THE PREFERRED EMBODIMENTS

First Embodiment

Figure 1:
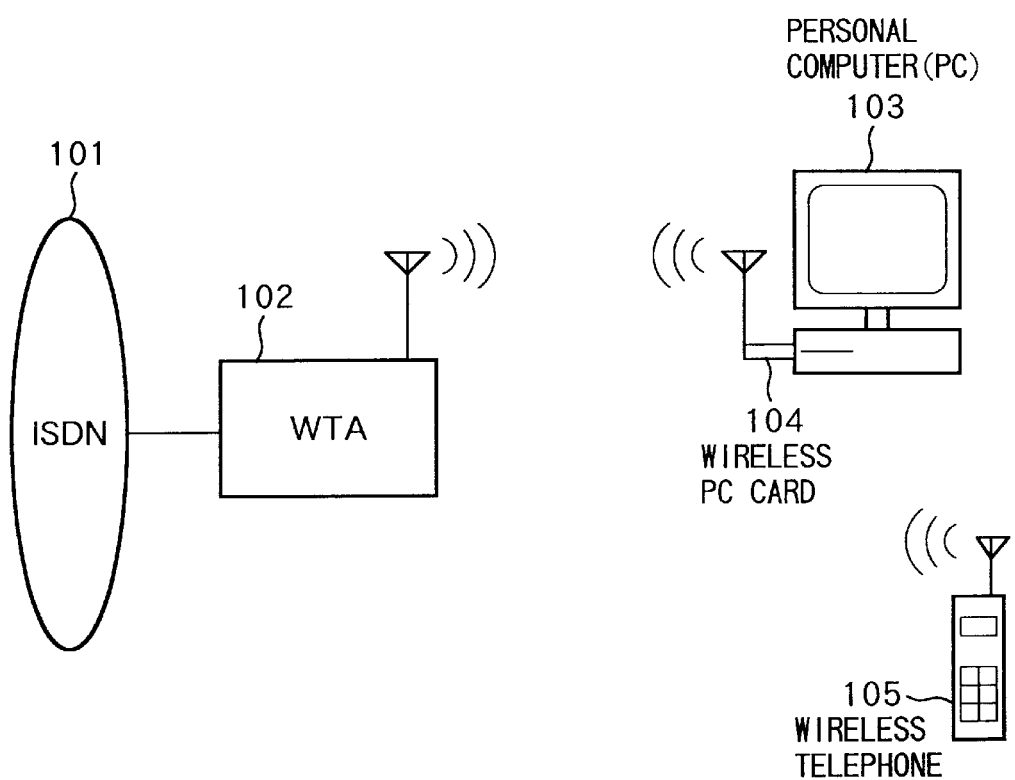
FIG. 1 is a diagram showing the configuration of a system according to a first embodiment of the present invention.

FIG. 1 is an explanatory view illustrating the configuration of a wireless communication system according to a first embodiment of the present invention. In this embodiment, a PHS telephone will be described as an example of a digital cordless telephone. The wireless communication system includes a wireless terminal adapter 102 connected to an ISDN 101 and corresponding to a network controller, a personal computer (PC) 103 equipped with a wireless PC card 104 and wirelessly linked to the wireless terminal adapter 102, and a wireless telephone 105.

The wireless terminal adapter 102 accommodates an ISDN line and, at the same time, functions as a PHS master device, converts voice and data, which have been transmitted from a PHS wireless terminal, to voice and data having the transmission speed of the ISDN and transmits the converted voice and data to the ISDN.

FIG. 2 is a block diagram showing the construction of the wireless terminal adapter 102 according to the first embodiment.

The wireless terminal adapter 102 includes a CPU 201 for controlling the overall device in accordance with a program that has been stored in a memory 202, the memory 202 storing various programs and data, a data bus 203 for transferring data, an ISDN interface 205 which allows the connection of an ISDN line 204, a multiplexer 206 for changing over data connected to B1/B2 channels of the ISDN interface 205, a speed converter 207 which converts 32-kbps data to 64-kbps data in accordance with I.460, a data multiplexer 208 for multiplexing data transmitted on two wireless channels and converting the data to 64-kbps data, an ADPCM/PCM converter 209 for converting between ADPCM (Adaptive Differential Pulse Code Modulation) data and PCM (Pulse Code Modulation) data, a switch 210 for changing over data sent and received on each wireless channel, a channel codec 211 which executes frame processing of transmission data, a wireless module 212 for performing wireless transmission, and an antenna 213.

FIG. 3 is a block diagram showing the construction of the wireless PC card 104 according to the first embodiment.

The wireless PC card 104 includes a CPU 301 for controlling the overall device in accordance with a program that has been stored in a memory 302, the memory 302 storing various programs and data, a data bus 303 for transferring data, a PC card interface 305 for connecting a PC card bus 304, a first parallel/serial converter 306, a second parallel/serial converter 307, a channel codec 308, a wireless module 309 and an antenna 310.

FIG. 4 is an explanatory view illustrating a transmission frame format of a wireless channel.

According to the format, the transmission frame has four channels for transmission and four channels for reception. Among these channels, first channels indicated by TC/RC are used as channels for control. The wireless terminal adapter 102, wireless PC card 104 and wireless telephone 105 are set to the control channel frequency in the first channel.

The other wireless channels T2, T3, T4, R2, R3, R4 are used voice or data communication and the transmission speed of each of these channels is 32 kbps.

Figure 6:
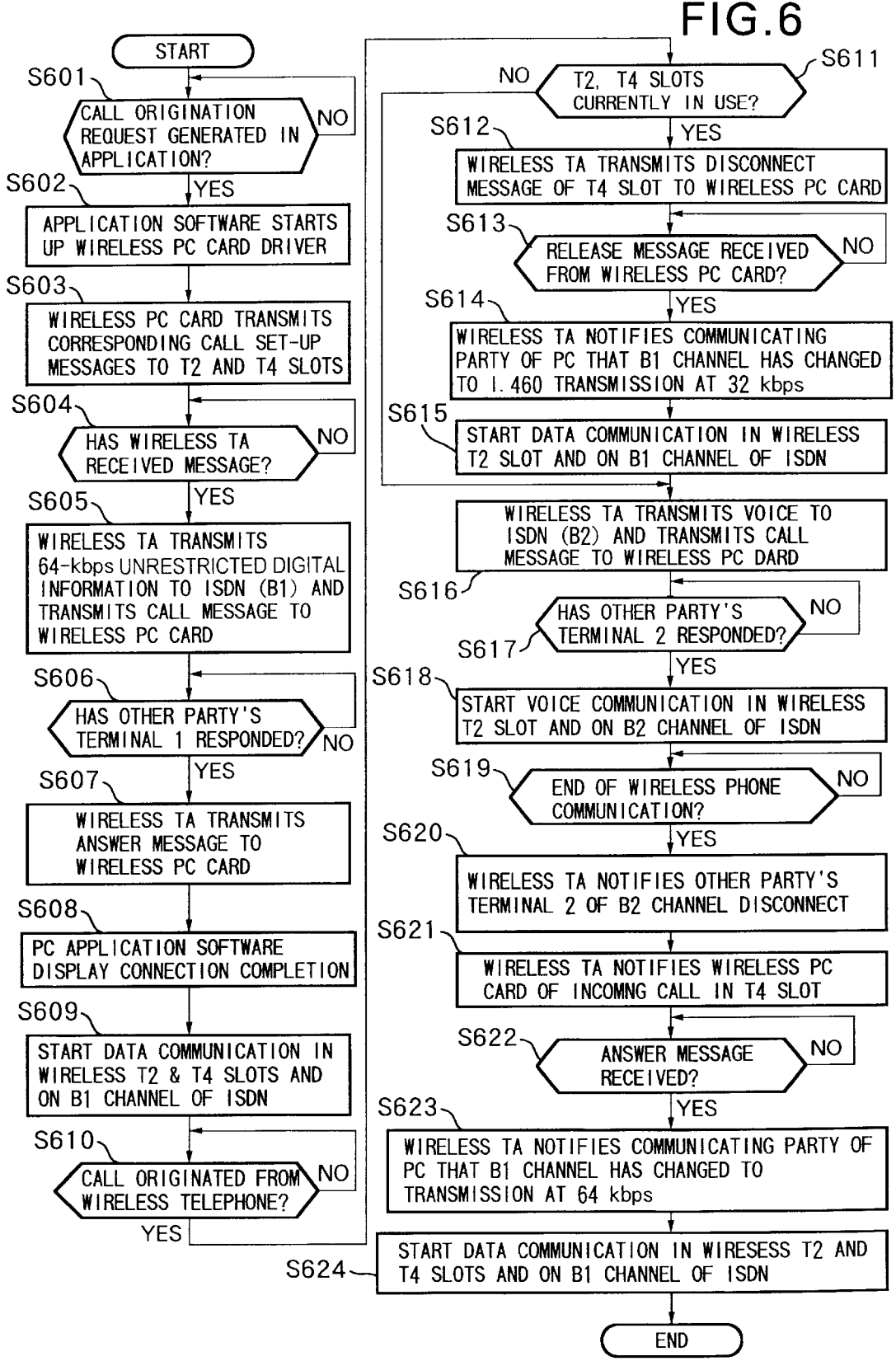
FIG. 6 is a flowchart showing the operation of the first embodiment.

FIG. 5 is an explanatory view showing the communication sequence of a wireless link and ISDN line according to the first embodiment, and FIG. 6 is a flowchart showing operation in a case where the PC in the first embodiment starts/stops a call from a wireless telephone.

Operation will be described in a case where the PC 103 performs communication using two wireless channels simultaneously and the wireless telephone 105 starts voice communication during a data transmission.

First, the operator performs a dialing operation by starting up communication application software in the PC 103 (S601). If the application software recognizes the origination request, then the application starts up a wireless PC card driver for performing communication using the wireless PC card 104 (S602). In accordance with an indication from the PC 103, the CPU 301 of the wireless PC card 104 transmits a call set-up message to the wireless terminal adapter 102. At this time a call set-up message corresponding to each channel is transmitted (S603) to perform communication using two wireless channels simultaneously.

By receiving the two call set-up messages from the wireless PC card 104 (S604), the CPU 201 of the wireless terminal adapter 102 recognizes the data transmission that employed the two channels and effects the connection to the other party's terminal by executing ISDN origination processing. At this time a transmission-capability information element in the call set-up message to the ISDN is set in such a manner that 64-kbps unrestricted digital information is transmitted (S605).

If the called terminal responds and an answer message is received (S606), the CPU 201 of the wireless terminal adapter 102 transmits the answer message to the wireless PC card 104 (S607). The PC 103 presents a display to the effect that the connection has been completed (S608) and then starts the transmission of data sent to the called party connected via the ISDN.

The wireless PC card driver writes the transmission data to the memory 302 of the wireless PC card 104. The transmission speed of this data is 64 kbps, which allows the transmission speed of the B channel of the ISDN to be exploited to the maximum degree. When the CPU 301 reads the transmission data out of the memory 302, it divides the data into two data streams each corresponding to a transmission speed of 32 kbps and delivers the data streams to the parallel/serial converters 306, 307 of the first and second channels. The two streams of data are each written to the channel codec 308. The latter assembles the transmission data into time-division multiplexed frame format and transmits this data to the wireless terminal adapter 102 using the two 32-kbps T2 and T4 channels. Thus, 64-kbps data is transmitted from the wireless PC card 104.

Upon receiving the data via these two channels, the CPU 201 of the wireless terminal adapter 102 causes the data multiplexer 208 to multiplex the two streams of serial data output by the channel codec 211 at 32 kbps and to convert the data to a single stream of 64-kbps serial data. The CPU 201 transmits the 64-kbps serial data to the ISDN interface 205 via the multiplexer 206. The ISDN interface 205 assembles the data into an ISDN frame and transmits the 64-kbps data, which has been sent from the PC, on the B1 channel (S609).

The data received from the called terminal is transmitted in the opposite direction while undergoing a similar speed conversion. More specifically, 64-kbps data received via the ISDN interface 205 is disassembled into two streams of 32-kbps serial data in the data multiplexer 208 and the data then enters the channel codec 211. The two streams of 32-kbps serial data are transmitted to the wireless PC card using the R2 and R4 channels of the wireless channels. The two-streams of 32-kbps data output by the channel codec 308 are multiplexed to 64-kbps data in the wireless PC card 104 and the multiplexed data is sent to the PC 103. Thus, it is possible to transmit data at 64 kbps, which is twice the transmission speed of the prior art.

It is also possible for the wireless telephone 105 to perform voice communication via the ISDN while the PC 103 is carrying out data communication at the high speed of 64 kbps. When a dialing operation is performed at the wireless telephone 105 (S610), call origination processing is executed by the control channels TC, RC in regard to the wireless terminal adapter 102 in accordance with the above-described control sequence of FIG. 5 in the same manner as the wireless PC card 104.

When the wireless terminal adapter 102 senses that the T2/R2 channels and T4/R4 channels are already being used in communication with the wireless PC card 104 (S611), the wireless terminal adapter 102 sends the wireless PC card 104 a disconnect message in regard to the T4 channel (S612).

As a result, the CPU 301 of the wireless PC card 104 recognizes that it is necessary to release the T4 channel being used and transmits a release message to the wireless terminal adapter 102. Upon receiving the release message from the wireless PC card 104 (S613), the CPU 201 of the wireless terminal adapter 102 notifies the other party's terminal, via the ISDN, of the fact that the 64-kbps transmission has been changed over to a transmission in accordance with I.460 based upon 32 kbps (S614). This is performed utilizing a user-user signal connection.

Upon receiving the request for opening the T4 channel, the CPU 301 of the wireless PC card 104 performs control so as to halt the transmission of one of the two 32-kbps data streams and in such a manner that the channel codec 308 performs data transmission using solely the T2 channel (S615).

After the above-described processing is executed, the wireless terminal adapter 102 sends the wireless telephone 105 a call set-up acceptance message and, at the same time, sends the ISDN a call set-up message indicating that voice communication is performed via the B2 channel (S616). If the other party's terminal responds and an answer message is received from the ISDN (S617), the wireless terminal adapter 102 transmits the answer message to the wireless telephone 105 on the control channel and the wireless telephone 105 is connected to the other party's terminal.

After the connection is made, the wireless telephone 105 communicates 32-kbps ADPCM data with the wireless terminal adapter 102 using the T4, R4 channels.

The CPU 201 of the wireless terminal adapter 102 performs control so as to change over the changeover switch 210 so that the T4 channel is connected to the ADPCM/PCM converter 209. As a result, the received 32-kbps ADPCM data is converted to 64-kbps PCM data and transmitted via the B2 channel of the ISDN (S618).

Further, the voice received on the B2 channel of the ISDN is transmitted to the wireless telephone 105 via the wireless terminal adapter 102. The ADPCM data is converted to analog data in the wireless telephone 105 and the analog data is output as audio.

Next, if the wireless telephone 105 has completed voice communication (S619), it is possible for the wireless PC card 104 to perform high-speed data communication again using two channels.

If communication by the wireless telephone 105 is completed and a T4-channel disconnect message is sent to the wireless terminal adapter 102, the latter transmits the disconnect message to the ISDN and disconnects the B2 channel (S620). The wireless terminal adapter 102 transmits an incoming-call message to the wireless PC card 104 to notify it of the fact that the T4 channel can be used (S621).

Upon receiving this notification, the wireless PC card 104 transmits a call answer message (S622) in order to acquire the right to use the T4 channel. Upon verifying that there is no a request to use the wireless channel from another terminal, the wireless terminal adapter 102 transmits a transmission-capability information element to the other party's terminal via the ISDN by means of a user-user signal connection to notify the terminal of the fact that the data transmission speed will be changed from 32 kbps to 64 kbps (S623).

Thereafter, the wireless terminal adapter 102 sends the wireless PC card 104 an answer message and, upon receiving the answer message, the wireless PC card 104 starts 64-kbps data transmission using the T2 and T4 channels simultaneously (S624).

The description above deals with processing in a case where the wireless telephone 105 has issued a call origination request while the wireless PC card 104 is executing data communication. However, similar processing would be executed also in a case where an incoming call arrives at the wireless telephone 105 from ISDN while the wireless PC card 104 is performing communication.

After it receives the call set-up message from the ISDN, the wireless terminal adapter 102, upon sending the ISDN a call set-up acceptance message, transmits a T4-channel disconnect message to the wireless PC card 104 to request release of the T4 channel. Upon receiving a confirmation message for releasing the T4 channel from the wireless PC card 104, the wireless terminal adapter 102 notifies the other party's terminal, via the ISDN, of the fact that the 64-kbps transmission has been changed over to a transmission in accordance with I.460 based upon 32 kbps. This is performed utilizing a user-user signal connection.

When one wireless channel is released, the wireless terminal adapter 102 transmits a call set-up message to the wireless telephone 105 to notify it of the incoming call. Upon receiving the answer message from the wireless telephone 105, the wireless terminal adapter 102 transmits the answer message to the ISDN, after which the wireless telephone 105 is capable of starting voice communication.

Thus, during the time that the wireless PC card 104 is wirelessly accessing the wireless terminal adapter 102, it is possible for the wireless telephone 105 to use a wireless channel in a case where a request for start of voice communication by the wireless telephone 105 is issued even while the wireless PC card 104 is performing 64-kbps high-speed data transmission using two channels.

When communication by the wireless telephone 105 is finished, it is possible for high-speed data communication is be performed again using two channels.

Second Embodiment

A second embodiment of the present invention will be described next.

In data communication according to the first embodiment, data transmitted from the wireless PC card 104 is converted as is to 64-kbps data and transmitted to the ISDN without buffering being carried out within the wireless terminal adapter 102.

However, it is possible to obtain similar results even is buffering is performed in packet units within the wireless terminal adapter 102. An advantage here is that even if the number of wireless channels used changes and there is a change in the transmission speed over the wireless link, it is unnecessary to change the transmission-performance information element between the device and the other party connected via the ISDN.

More specifically, it is possible to deal with a change in data transmission speed by fixing the transmission-performance information element at 64-kbps unlimited digital information and by judging in the other party's terminal that valid data has been received after the packet header is sensed.

Figure 7:
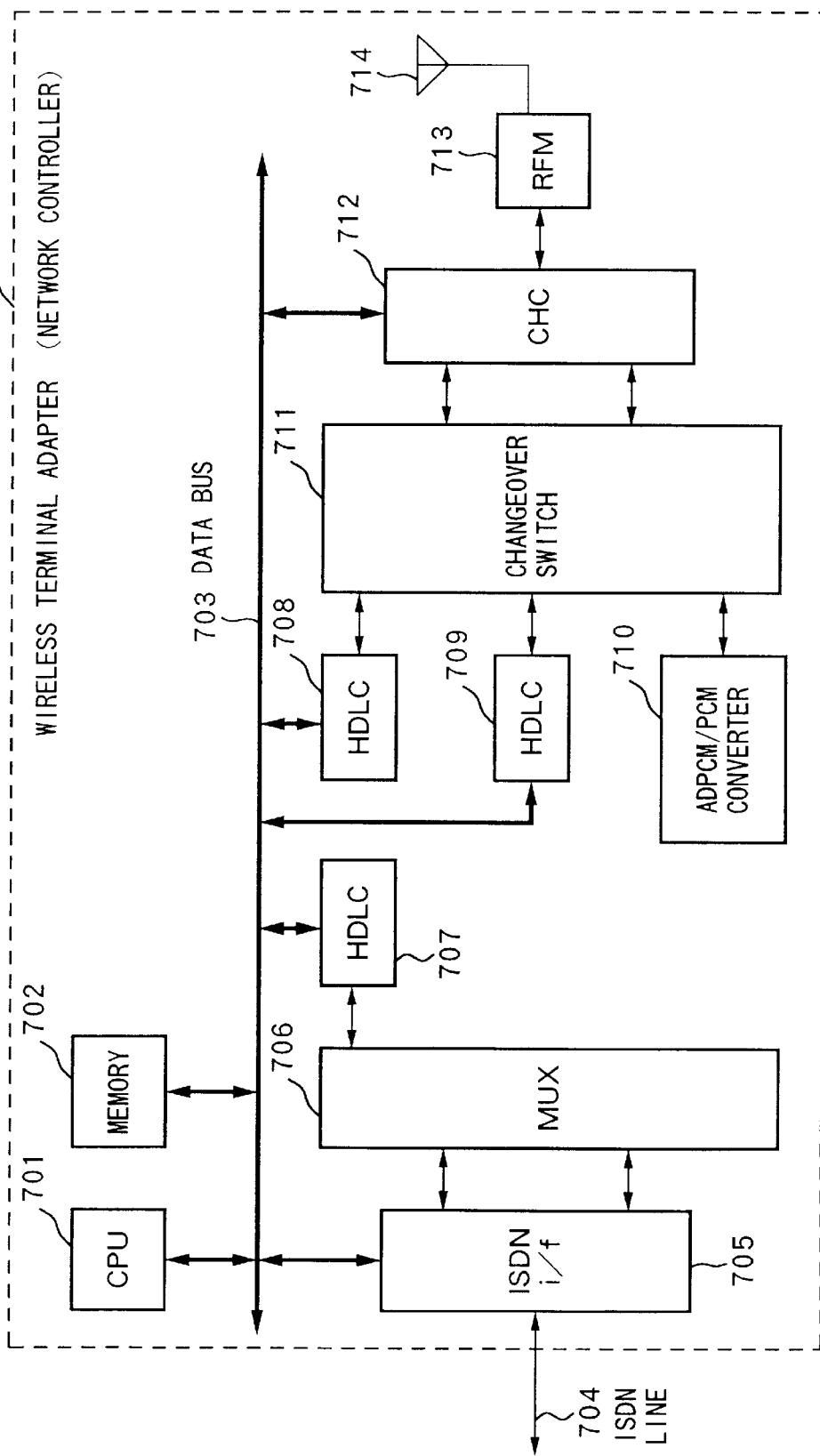
FIG. 7 is a block diagram showing a wireless terminal adapter according to a first embodiment of the present invention.

FIG. 7 is a block diagram illustrating the construction of the wireless terminal adapter 102 according to a second embodiment of the present invention.

The wireless terminal adapter 102 includes a CPU 701 for controlling the overall device in accordance with a program that has been stored in a memory 702, the memory 702 storing various programs and data, a data bus 703 for transferring data, an ISDN interface 705 which allows the connection of an ISDN line 704, a multiplexer 706 for changing over data connected to B1/B2 channels of the ISDN interface 705, a multiplexer 706 for changing over data connected to B1/B2 channels of the ISDN interface 705, an HDLC (High-level Data Link Control) controller 707 for assembling/disassembling HDLC packets transmitted by the ISDN, first and second HDLC controllers 708, 709 for assembling/disassembling HDLC packets transmitted by the wireless link, an ADPCM/PCM converter 710 for converting ADPCM data to PCM data, a switch 711 for changing over data sent and received on each wireless channel, a channel codec 712 which executes frame processing of transmission data, a wireless module 713 for performing wireless transmission, and an antenna 714.

Figure 8:
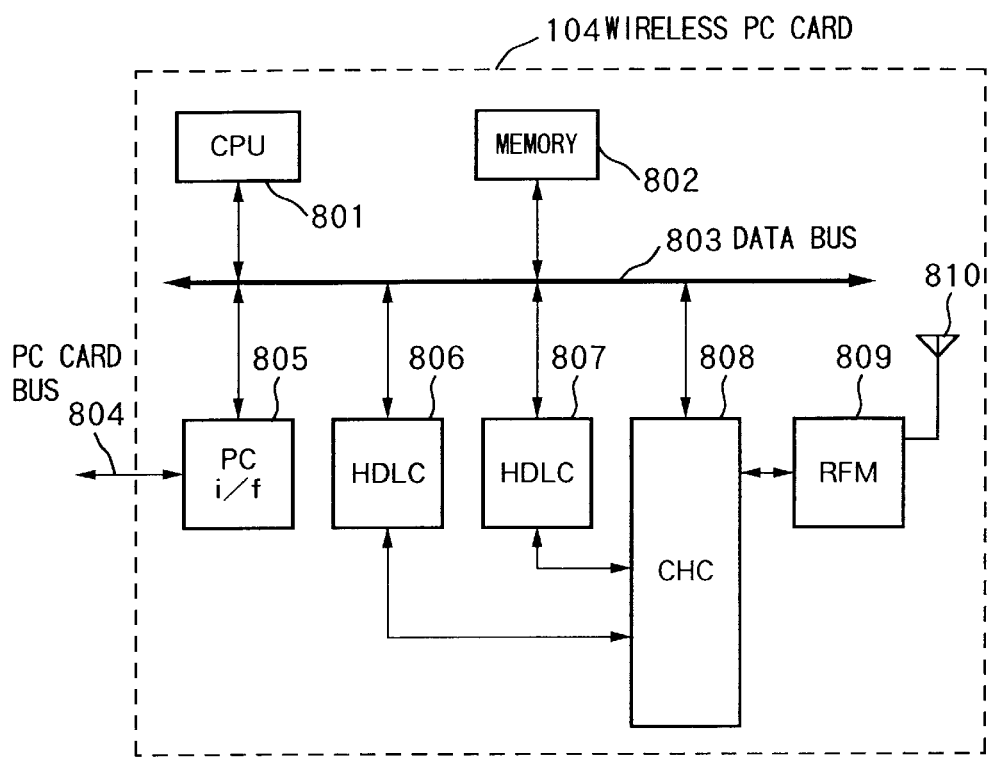
FIG. 8 is a block diagram of a wireless PC card according to the second embodiment.

FIG. 8 is a block diagram showing the construction of the wireless PC card 104 according to the second embodiment.

The wireless PC card 104 includes a CPU 801 for controlling the overall device in accordance with a program that has been stored in a memory 802, the memory 802 storing various programs and data, a data bus 303 for transferring data, a PC card interface 805 for connecting the PC card bus 804, first and second HDLC controllers 806, 807 for assembling/disassembling HDLC packets transmitted by the ISDN, a channel codec 808 for executing transmission-data frame processing, a wireless module 809 for performing wireless transmission, and an antenna 810.

When data is transmitted by the wireless PC card 104, data is written from memory to the HDLC controllers 806, 807 and is assembled into an HDLC frame format to which a flag, address, CRC, etc., have been attached. At this time data transmitted on the T2 channel is assembled by the first HDLC controller 806 and data transmitted on the T4 channel is assembled by the second HDLC controller 807.

Upon receiving packets on the T2 and T4 channels, the wireless terminal adapter 102 transfers the received packets to the memory 702 via the HDLC controllers 708, 709 on respective channels and requests re-transmission with regard to any packets found to be erroneous by a CRC check. Moreover, the wireless terminal adapter 102 rearranges the packets in the order to packet numbers attached to the data field and sends the HDLC controller 707 the data to be transmitted to the ISDN. The data that has been assembled into the prescribed frame is transmitted to the ISDN by the HDLC controller 707 via the ISDN interface 705.

The transmission speed of the data sent from the wireless PC card 104 is 32 kbps on each channel. Accordingly, if the transmission speed of the data following the rearrangement of the packets by the wireless terminal adapter 102 is less than 64 kbps and a buffer memory having a capacity which takes into account packets whose arrival is delayed by retransmission control is provided, it will be possible to transmit data to the ISDN without causing data overflow.

In a case where the wireless telephone 105 starts voice communication when data communication is thus being performed using two channels, the wireless PC card 104 is notified of a request for release of the wireless channel T4 through a procedure similar to that of the first embodiment.

From this point onward the wireless PC card 104 modifies processing so as to send the transmission data solely to the first HDLC controller 806. The wireless terminal adapter 102 performs control to change over the changeover switch 711 so that the data on the T4 channel is connected to the ADPCM/PCM converter 710.

Thus, voice communication can begin even during data communication using a plurality of channels.

Third Embodiment

A third embodiment will now be described.

In the first embodiment, the data transmission speed is 32 kbps or 64 kbps. However, the same results can be obtained even with low-speed (e.g., 19.2 kbps) data. In the case of such low-speed data, it is necessary to insert redundant data within the wireless PC card 104 in accordance with a conversion method stipulated by ITU-T recommendation V.110 and convert 19.2 kbps to 32 kbps.

Figure 9:
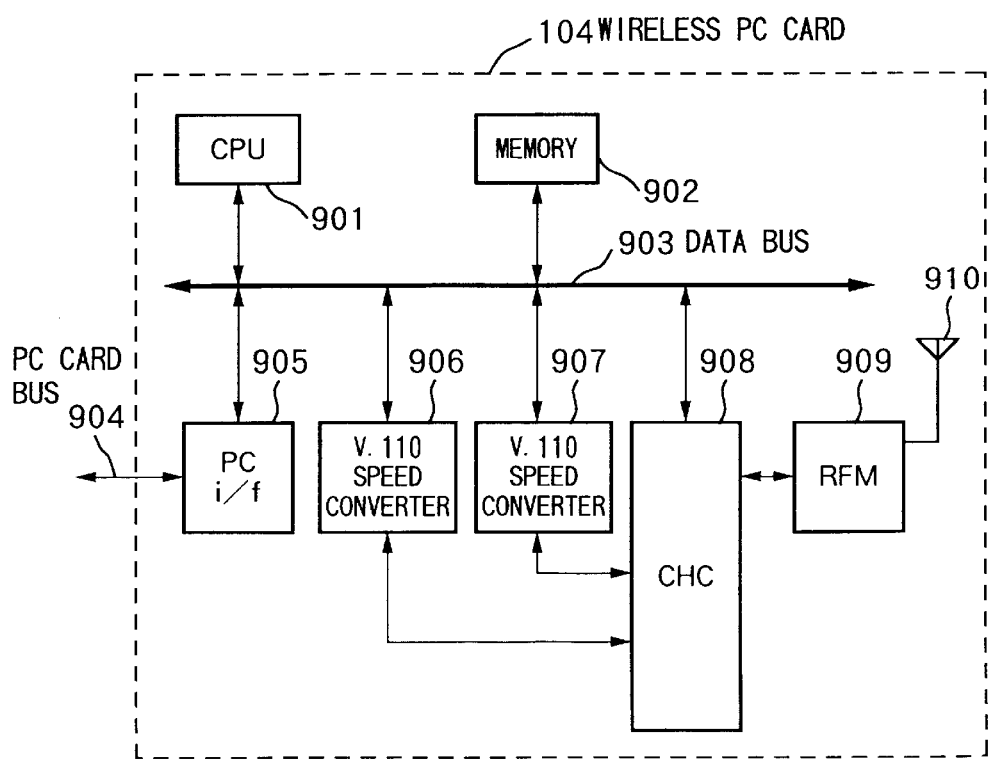
FIG. 9 is a block diagram of a wireless PC card according to the second embodiment.

FIG. 9 is a block diagram showing the construction of the wireless PC card 104 according to the third embodiment.

The wireless PC card 104 includes a CPU 901 for controlling the overall device in accordance with a program that has been stored in a memory 902, the memory 902 storing various programs and data, a data bus 903 for transferring data, a PC card interface 905 for connecting a PC card bus 904, a first V.110 speed converter 906 and a second V.110 speed converter 907 for converting data having a transmission speed less than 32 kbps to data having a transmission speed of 32 kbps, a channel codec 908 for executing transmission-data frame processing, a wireless module 909 for performing wireless transmission, and an antenna 910.

Operation according to the third embodiment is the same as that of the first embodiment with the exception of the fact that transmission data is written from the memory 902 to the V.110 speed converters 906, 907 and data that has been converted to the speed of 32 kbps by the V.110 speed converters 906, 907 enters the channel codec 908.

Fourth Embodiment

A fourth embodiment will be described next.

A wireless telephone is assumed to be the second wireless terminal in the first embodiment. However, the same effects can be obtained even if the second wireless terminal is a wireless PC card which performs data communication in a manner similar to that of the first wireless terminal.

In a case where the two terminals communication simultaneously, each performs a 32-kbps transmission utilizing one channel each. When communication by one terminal is completed, the other terminal performs 64-kbps transmission utilizing two channels.

Fifth Embodiment

A fifth embodiment will now be described.

In the first embodiment, it is assumed that the wireless link is a PHS wireless link in which the transmission speed of one channel is 32 kbps. However, similar operation is possible even with other types of wireless communication links. For example, data transmission at higher speed can be realized using spread spectrum communication.

Further, in case of a higher speed wireless channel, it is possible to increase the number of wireless channels. When high-speed data communication is performed in such case, eight channels, for example, are used. When communication requests are issued by another terminals, control is performed so as to release the channels one at a time, thereby making it possible to utilize wireless channels efficiently.

Sixth Embodiment

A sixth embodiment will be described next.

In the first embodiment, only one channel of the ISDN is used in data communication. However, in a case where the overall transmission speed of the wireless link is large, as in the fifth embodiment, more effective utilization of the link can be achieved by combining bulk transfer of the B1 and B2 channels of the ISDN.

The sixth embodiment will be described for a case where the number of wireless channels (other than control channels) having a transmission speed of 32 kbps is eight in both directions (four 128-kbps channels in one direction).

Figure 10:
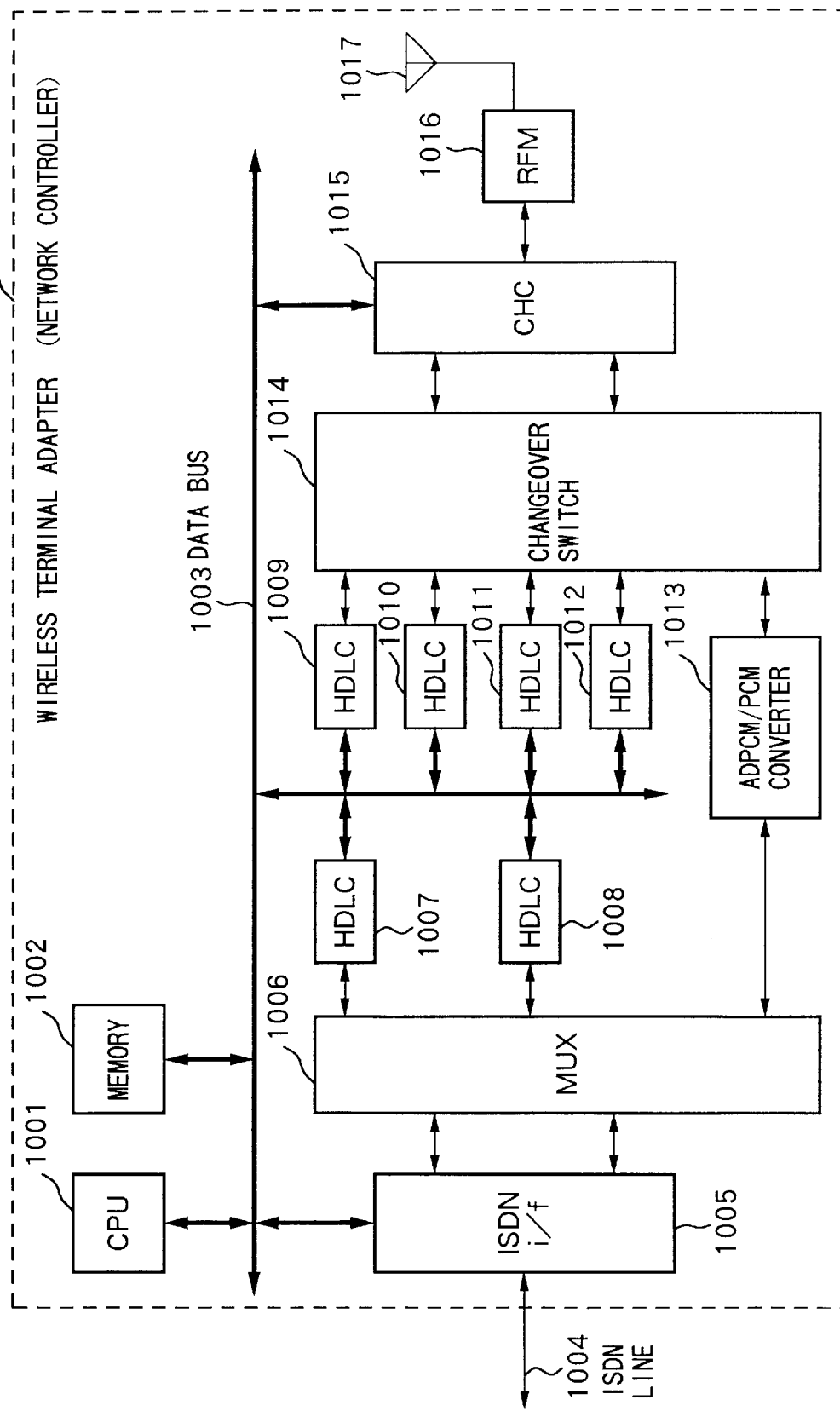
FIG. 10 is a block diagram showing a wireless terminal adapter according to a sixth embodiment of the present invention.

FIG. 10 is a block diagram illustrating the construction of the wireless terminal adapter 102 according to the sixth embodiment.

The wireless terminal adapter 102 includes a CPU 1001 for controlling the overall device in accordance with a program that has been stored in a memory 1002, the memory 1002 storing various programs and data, a data bus 1003 for transferring data, an ISDN interface 1005 which allows the connection of an ISDN line 1004, a multiplexer 1006 for changing over data connected to B1/B2 channels of the ISDN interface 1005, a multiplexer 1006 for changing over data connected to B1/B2 channels of the ISDN interface 1005, an HDLC controller 1007 for the B1 channel, an HDLC controller 1008 for the B2 channel, HDLC controllers 1009~1012 for assembly and disassembling HDLC packets transmitted on four channels of the wireless link, an ADPCM/PCM converter 1013 for converting ADPCM data to PCM data, a switch 1014 for changing over data sent and received on each wireless channel, a channel codec 1015 which executes frame processing of transmission data, a wireless module 1016 for performing wireless transmission, and an antenna 1017.

If the personal computer performs data communication in the arrangement described above, transmission is carried out at 128 kbps, which corresponds to B1, B2 bulk transfer of the ISDN, using all wireless channels. In a manner similar to that of the second embodiment, the wireless terminal adapter 102 disassembles packets on respective channels using the HDLC controllers 1009~1012, rearranges the data in the order of the packet numbers and stores the data in the memory 1002. Next, HDLC frames are re-assembled by the HDLC controllers 1007, 1008 and the frames are transmitted on respective B1, B2 channels.

Thus, in a case where a call is originated by the wireless telephone 105 or a call from the ISDN is terminated at the wireless telephone 105 when bulk transfer is being performed at 128 kbps, the wireless PC card 104 is notified of a request for release of the wireless channel through a procedure similar to that of the second embodiment, the B2 channel of the ISDN is released and, at the same time, control is performed in such a manner that only two wireless channels are used.

The data communication operation from this point onward is the same as that in the second embodiment for the case where two wireless channels are used, and a state is attained in which the HDLC controllers 1008, 1011 and 1012 are not used.

Thus, while communication is performed at a speed that corresponds to the maximum transmission speed of the ISDN in a case where communication is carried out solely by a data communication terminal, it is possible, when it becomes necessary for another terminal to communicate, to release some slots of the wireless link and one channel of the ISDN to this other terminal. This makes it possible to utilize the communication link effectively.

Seventh Embodiment

A seventh embodiment will now be described.

In order to use the wireless channels and ISDN channel efficiently, this embodiment provides an arrangement for matching the speeds of a plurality of wireless channels and one ISDN channel.

Figure 11:
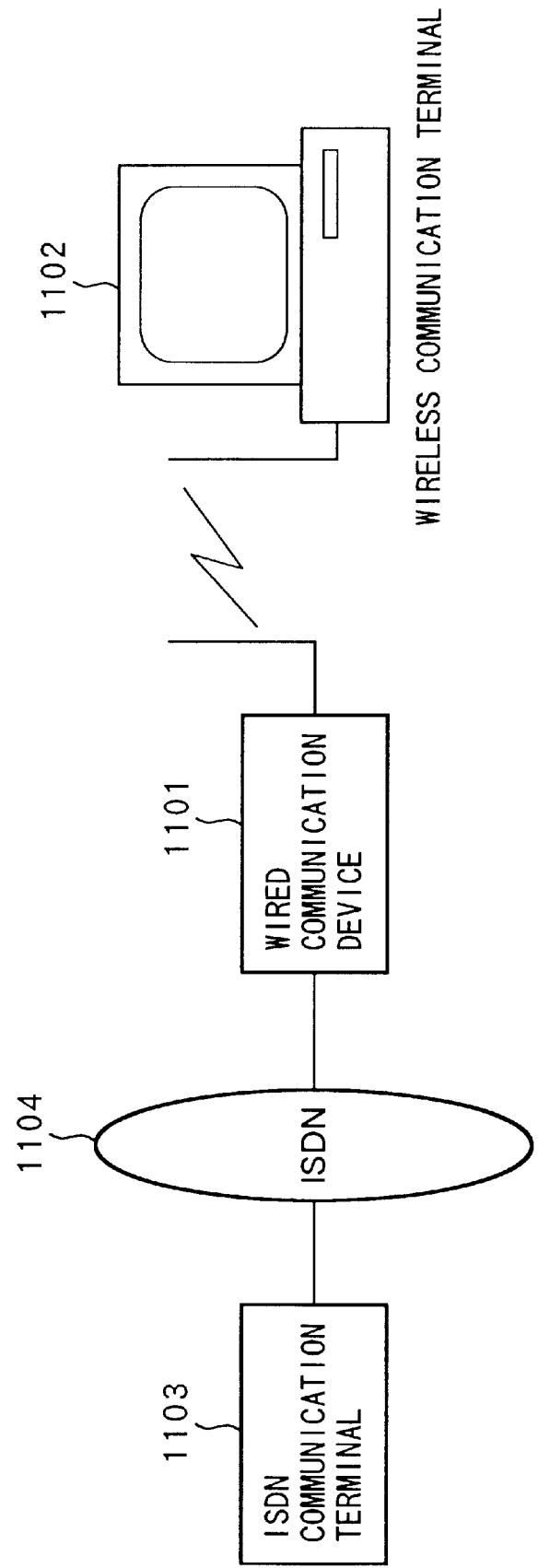
FIG. 11 is a diagram showing the configuration of a system according to a seventh embodiment of the present invention.

FIG. 11 is a diagram showing the configuration of a system according to this embodiment.

This system comprises a wired communication device 1101 having a PHS wireless communication function and connected to an ISDN public line, a wireless communication terminal 1102 having a PHS wireless communication function 1102 and a multimedia communication function, an ISDN communication terminal 1103 connected to the ISDN public line and having and having a multimedia communication function, and an ISDN public line network 1104.

Figure 12:
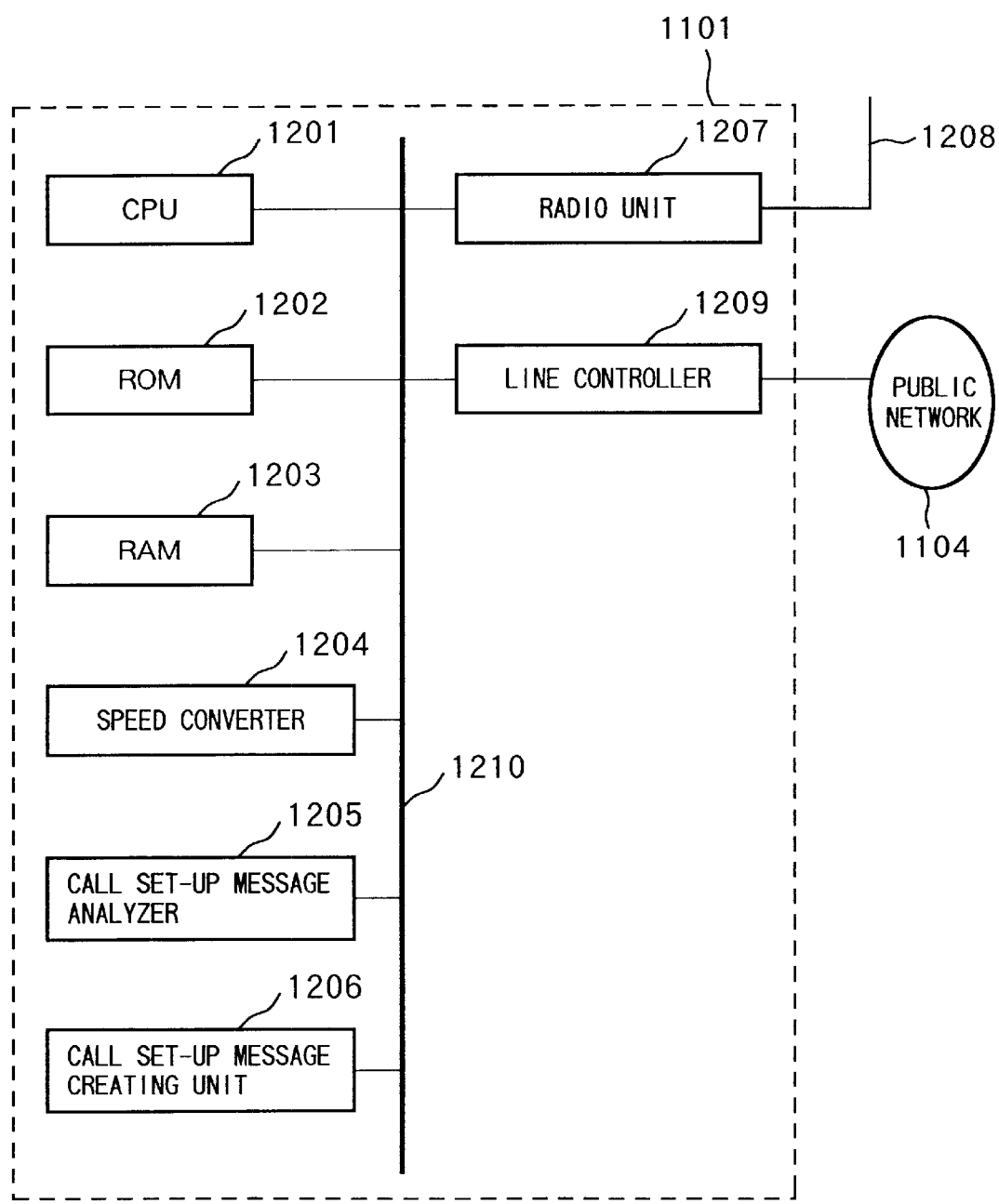
FIG. 12 is a block diagram showing wired communication device according to the seventh embodiment.

FIG. 12 is a block diagram showing the construction the wired communication device 1101.

The wired communication device 1101 includes a CPU 1201 which is the nucleus of the device 1101 and supervises control of the overall device inclusive of its components and wireless controller in accordance with programs stored in a ROM 1202. The latter stores the control program of the CPU 1201. A RAM 1203 stores various data for controlling the CPU 1201 and provides a working area for various arithmetic operations.

A speed converter 1204 performs a speed conversion to convert 32-kbps data from the PHS wireless link to 64-kbps data for the ISDN line, bundling the data of two PHS channels onto one ISDN channel and, conversely, disassembling data. A call set-up message analyzer 1205 analyzes a call set-up message received from the PHS wireless link or ISDN line. A call set-up message creating unit 1206 creates a call-set up message sent to the PHS wireless link or ISDN line.

A radio unit 1207 has a channel codec which, under the control of the CPU 1201, subjects a control signal to processing such as scrambling and time-division multiplexes data onto a prescribed frame, and has functions for executing processing in such a manner that a digital signal that has been put in frame form can be modulated and wireless transmitted, transmitting the processed signal to an antenna 1208, demodulating a signal wirelessly received from the antenna 1208 and processing the demodulated signal into a digital signal in the form of a frame. The antenna 1208 sends and receives radio signals. A line controller 1209 performs communication with a terminal connected to the public line network 1104 and controls network calls. A bus 1210 is an internal bus for transmitting various signals within the wired communication device 1101.

Figure 13:
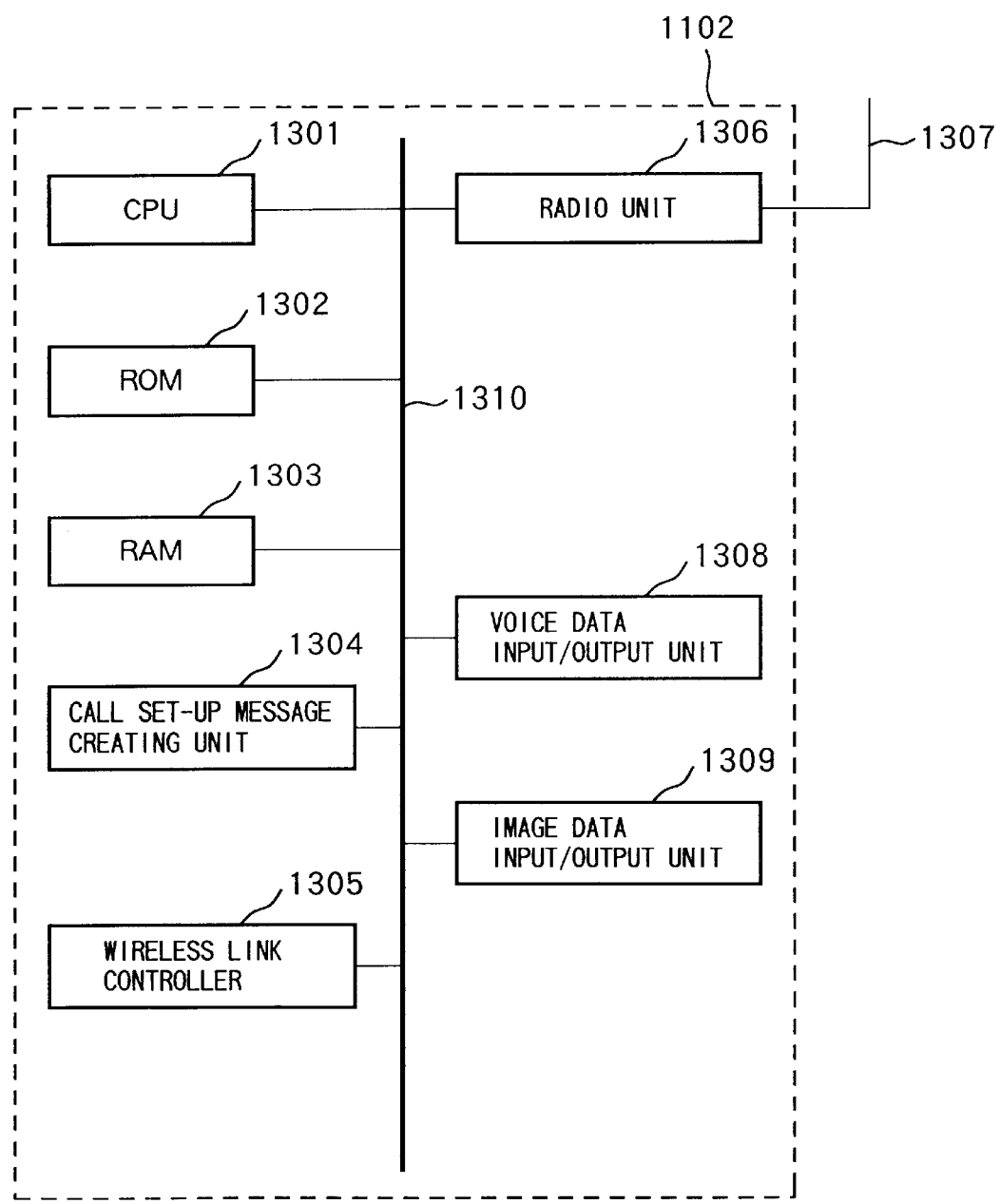
FIG. 13 is a block diagram showing a wireless communication terminal according to the seventh embodiment.

FIG. 13 is a block diagram showing the construction the wireless communication terminal 1102.

The wireless communication terminal 1102 includes a CPU 1301 which is the nucleus of the terminal 1102 and supervises control of the overall terminal inclusive of its components and wireless controller in accordance with programs stored in a ROM 1302. The latter stores the control program of the CPU 1301. A RAM 1303 stores various data for controlling the CPU 1301 and provides a working area for various arithmetic operations.

A call set-up message creating unit 1304 creates a call-set up message sent to the PHS wireless link. A wireless link controller 1305 controls the PHS wireless link.

A radio unit 1306 has a channel codec which, under the control of the CPU 1301, subjects a control signal to processing such as scrambling and time-division multiplexes data onto a prescribed frame, and has functions for executing processing in such a manner that a digital signal that has been put in frame form can be modulated and wireless transmitted, transmitting the processed signal to an antenna 1307, demodulating a signal wirelessly received from the antenna 1307 and processing the demodulated signal into a digital signal in the form of a frame. The antenna 1307 sends and receives radio signals. A voice data input/output unit 1308 enters voice data which flows into the wireless link and outputs voice data which arrives from the wireless link. An image data input/output unit 1309 enters image data which flows into the wireless link and outputs image data which arrives from the wireless link. A bus 1310 is an internal bus for transmitting various signals within the wireless communication terminal 1102.

Figure 14:
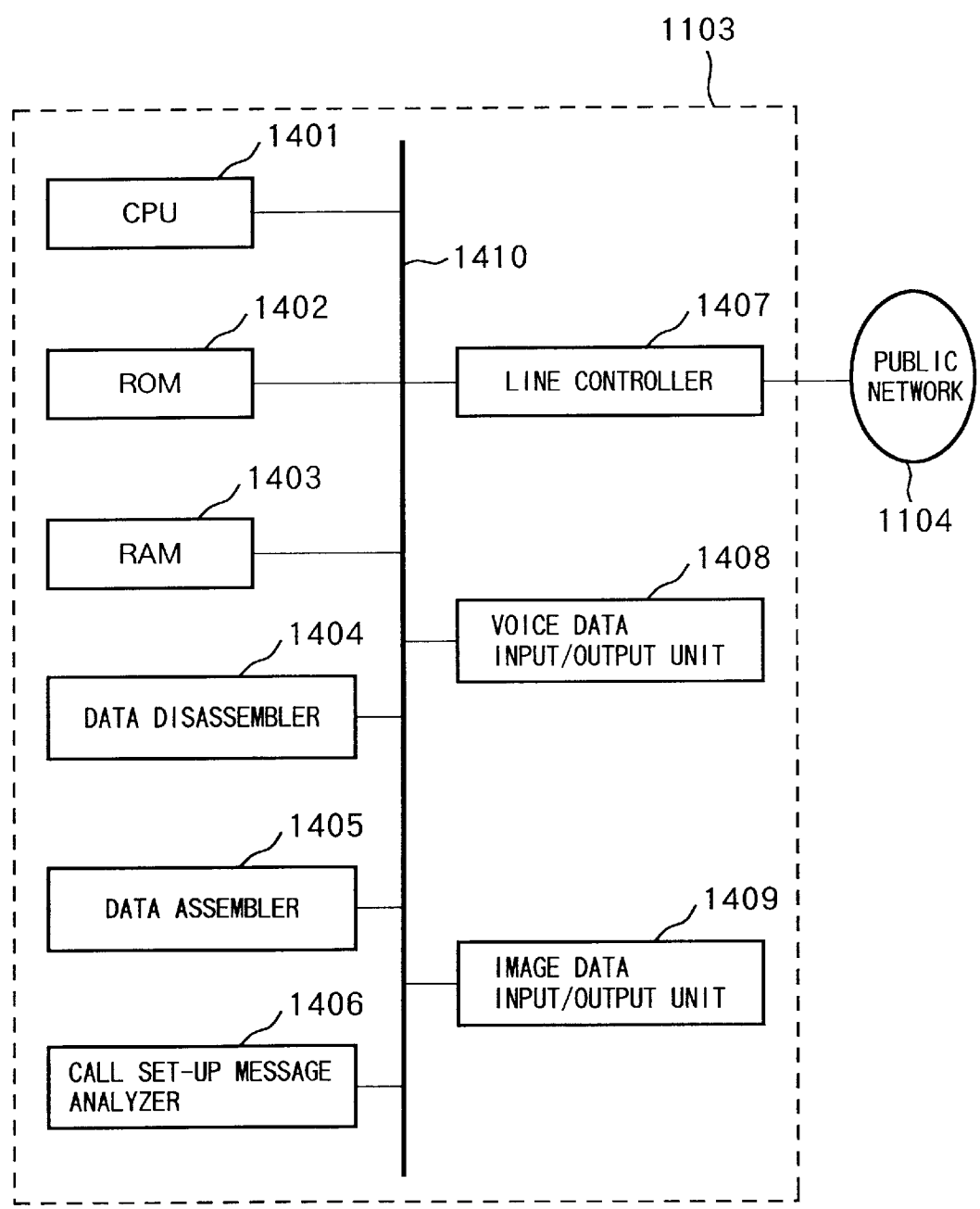
FIG. 14 is a block diagram of an ISDN communication terminal according to the seventh embodiment.

FIG. 14 is a block diagram illustrating the construction of the ISDN communication terminal 1103.

The ISDN communication terminal 1103 includes a CPU 1401 which is the nucleus of the terminal 1103 and supervises control of the overall terminal inclusive of its components and wireless controller in accordance with programs stored in a ROM 1402. The latter stores the control program of the CPU 1401. A RAM 1403 stores various data for controlling the CPU 1401 and provides a working area for various arithmetic operations.

A data disassembler 1404 analyzes data in a case where data, which used two PHS channels, of the data received from the ISDN line 1104 is bundled and sent. A data assembler 1405 is used in a case where voice data and image data is bundled and sent in a data transmission scheme using two PHS channels.

A call set-up message analyzer 1406 analyzes a call set-up message sent from the ISDN line. A line controller 1407 performs communication with a terminal connected to the public line network 1104 and controls network calls. A voice data input/output unit 1408 enters voice data which flows into the ISDN line and outputs voice data which arrives from the ISDN line. An image data input/output unit 1409 enters image data which flows into the ISDN line and outputs image data which arrives from the ISDN line. A bus 1410 is an internal bus for transmitting various signals within the wireless communication system.

A wireless frame used in this embodiment will now be described.

Figure 15A:
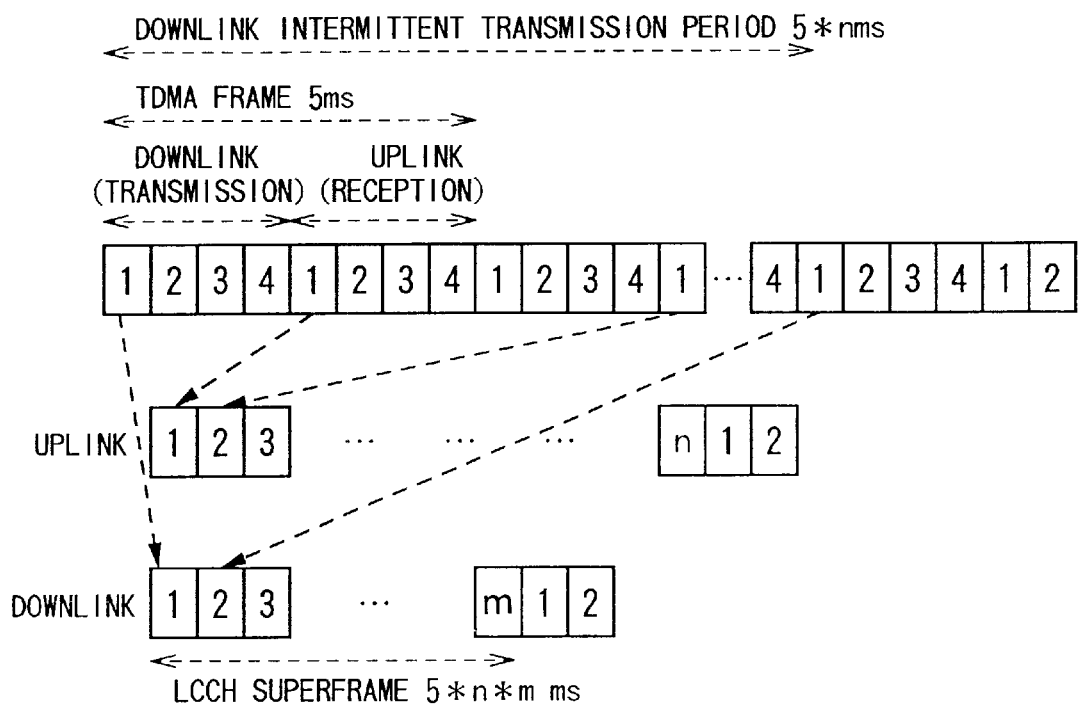
FIGS. 15A–15C are diagrams showing the structure of wireless frames according to the seventh embodiment.
Figure 15B:
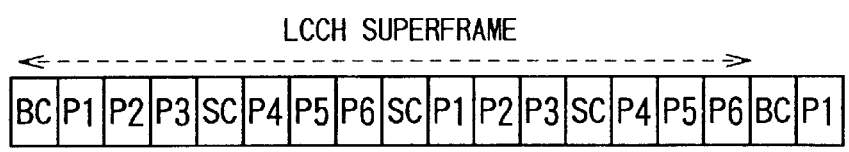
Figure 15C:
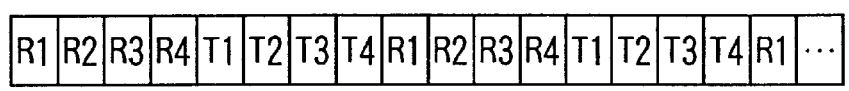

FIGS. 15A–15C are explanatory view illustrating the structure of a wireless frame used in this system. The details of the data within the frame will now be described.

FIG. 15A illustrates temporal constitution of a wireless control data frame. Uplink in FIG. 15A indicates communication from the wireless communication terminal 1102 to the wired communication device 1101, and downlink indicates communication from the wired communication device 1101 to the wireless communication terminal 1102. An uplink logical control channel (referred to as "LCCH" below) sends data using an uplink slot once in 5 ms. A downlink LCCH sends data using a downlink slot in a downlink intermittent transmission period of (5*n)ms.

FIG. 15B illustrates the structure of an LCCH superframe. This frame, which is constructed by bundling downlink LCCHs, transmits various control data. Here BC represents BCCH, which transmits a message related to system control, P1 through P6 each represent PCH, which is transmits a message related to an incoming call, and SC represents SCCH, which transmits a message related to the wireless link.

FIG. 15C illustrates the structure of a communication slot frame. Here R1 through R4 represent slots in which the wired communication device 1101 receives data. These correspond to channels 1 through 4 (first through fourth channels), respectively. Further, T1 through T4 are slots, which have been allocated to respective ones of the channels, in which the wireless communication terminal 1102 receives data.

The details of the operation of this embodiment having the construction set forth above will now be described. In this system, frames are constructed and control is performed as described above in order that communication may be performed between the wired communication device 1101 and the wireless communication terminal 1102.

Processing for when a transmission is performed between the wireless communication terminal 1102 and ISDN communication terminal 1103 will be described as the specific operation of this system.

FIG. 16 is an explanatory view showing a data communication sequence according to this embodiment.

Shown in FIG. 16 are a link channel establishment request 1601, link channel allocation 1602, PHS set-up 1603, PHS call set-up acceptance 1604, a definition information request 1605', a definition information response 1606, a wireless management function request 1607, a wireless management function request response 1608, security key set-up 1609, a move management function request 1610, a move management function request response 1611, an authentication request 1612, authentication confirmation 1613, additional information 1614, a PHS call 1615, a PHS answer 1616 and PHS answer confirmation 1617, ISDN call set-up 1620, ISDN call set-up acceptance, ISDN call 1622, ISDN response 1623, ISDN response confirmation 1624, data communication 1630 on the first channel of the PHS, data communication 1631 on the second channel of the PHS, and ISDN data communication 1632.

Here 1601~1617 perform communication on the PHS wireless logical control channel, 1620~1623 perform communication on the D channel of the ISDN, 1630, 1631 perform communication on the PHS communication channel, and 1632 performs communication on the B channel of the ISDN.

Figure 17:
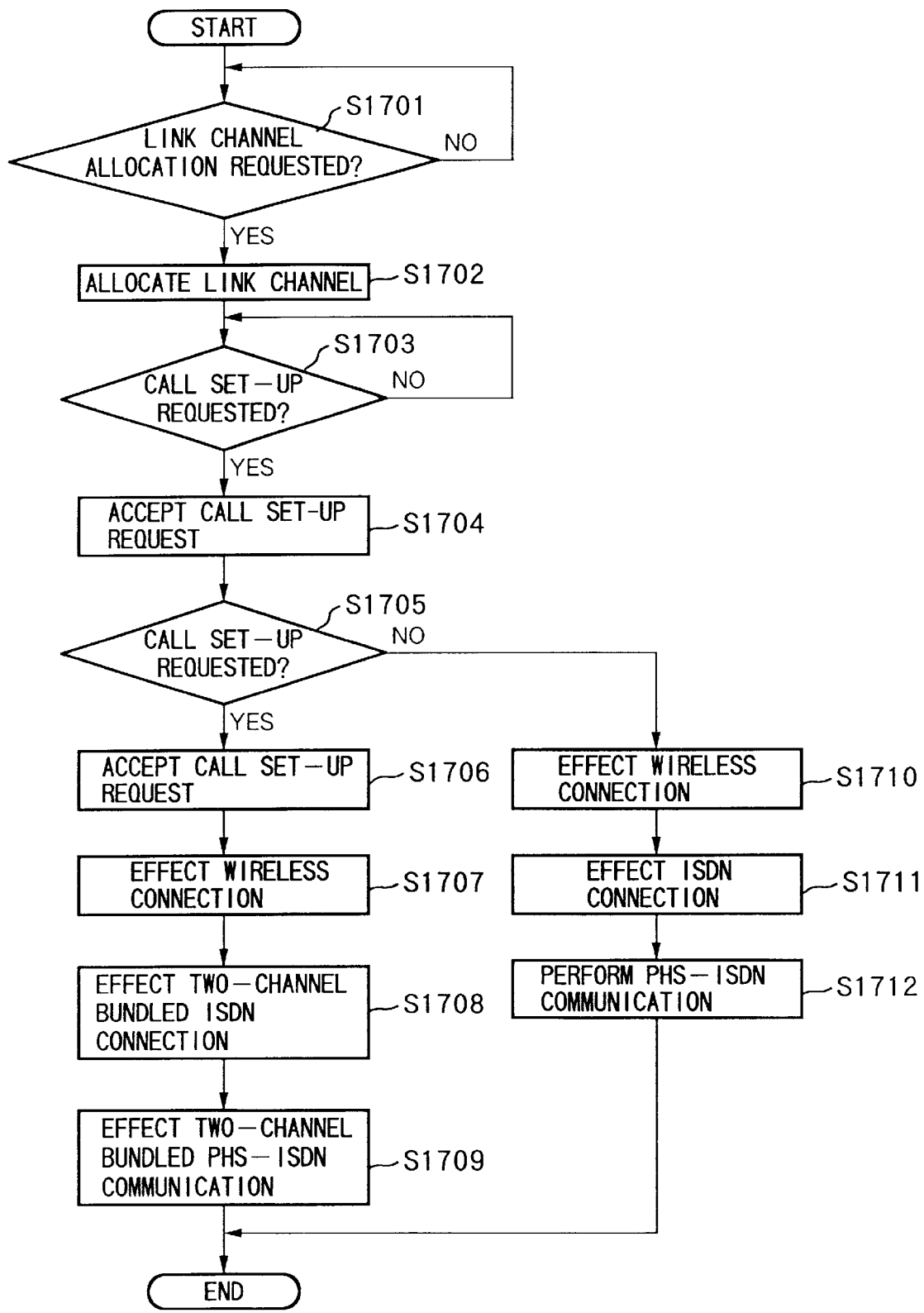
FIG. 17 is a flowchart showing the wireless connection operation according to the seventh embodiment.
Figure 18:
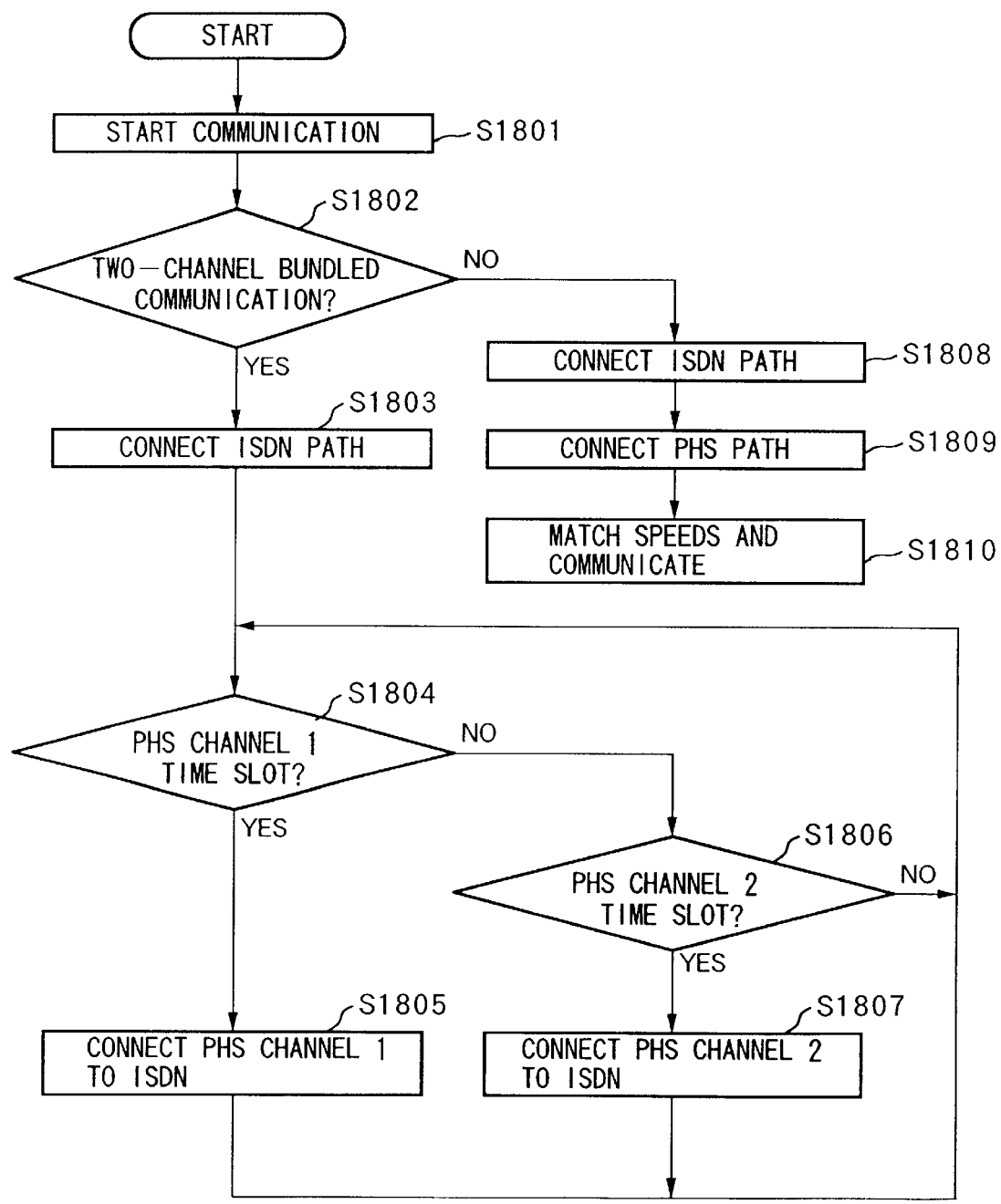
FIG. 18 is a flowchart showing the data communication operation of the wired communication device according to the seventh embodiment.
Figure 19:
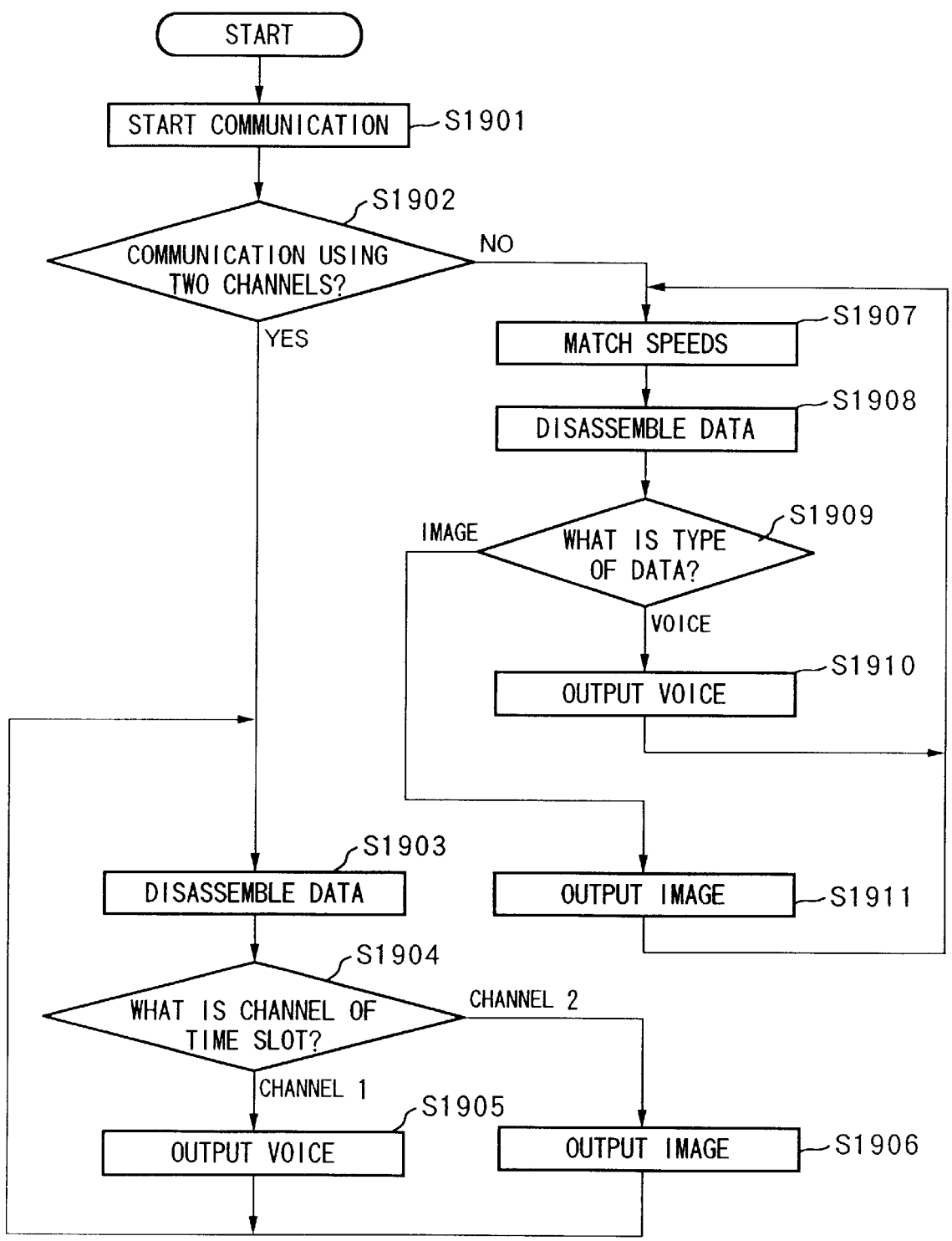
FIG. 19 is a flowchart showing the data communication operation of the ISDN communication terminal according to the seventh embodiment.

FIG. 17 is a flowchart illustrating a connection operation according to this embodiment, FIG. 18 is a flowchart showing the data transmission operation of the wired communication device 1101 according to this embodiment, and FIG. 19 is a flowchart showing the data reception operation of the ISDN communication terminal 1103 according to this embodiment.

When the link channel establishment request 1601 arrives from the wireless communication terminal 1102 (S1701) in FIG. 17, the CPU 1201 of the wired communication device 1101 sends the link channel allocation 1602 back to the wireless communication terminal 1102 (S1702). Next, when the PHS set-up request 1603 arrives from the wireless communication terminal 1102 (S1703), the CPU 1201 of the wired communication device 1101 sends the PHS call set-up acceptance 1604 back to the wireless communication terminal 1102 (S1704).

If the same call set-up 1603 whose destination is the ISDN terminal is again received from the wireless communication terminal 1102 (S1705), the CPU 1201 of the wired communication device 1101 sends the call set-up acceptance 1604 back to the wireless communication terminal 1102 (S1706) and the CPU 1201 of the wired communication device 1101 begins processing for bundling and transmitting two channels. The next phase is the wireless connection phase (S1707). The exchange from the definition information request 1605 to the additional information 1613 is carried out in the manner shown in FIG. 16 to establish a wireless link using two wireless channels.

Next, the CPU 1201 of the wired communication device 1101 causes the call set-up message creation unit 1206 to create the ISDN call set-up message 1620 for two-channel bundled communication and transmit the message to the ISDN communication terminal (S1708).

Figure 20A:
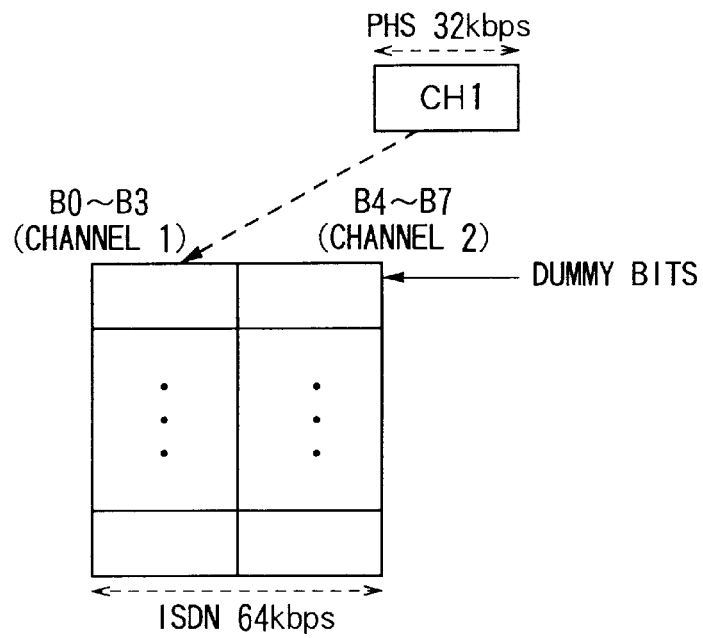
FIGS. 20A and 20B are diagrams useful in describing data transmission according to the seventh embodiment.
Figure 20B:
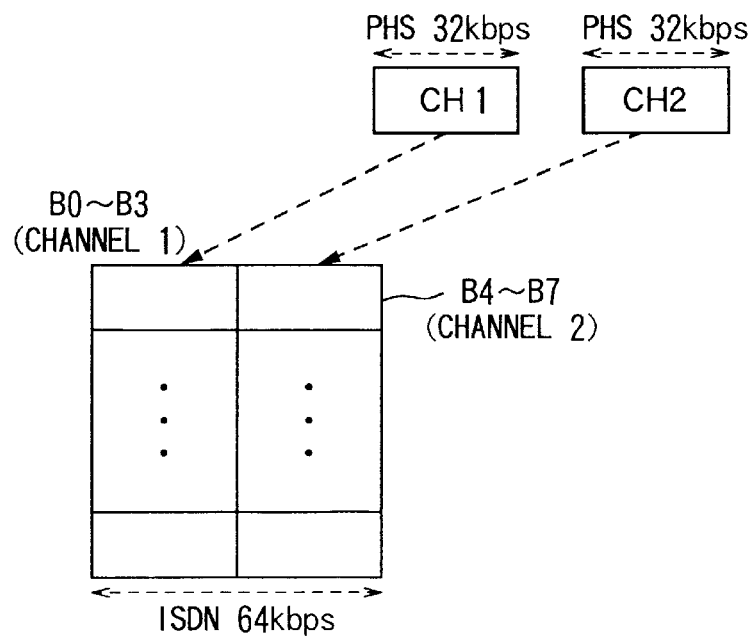

At this time an unlimited digital information is sent in the call set-up 1620 as data classification. Further, in terms of the ISDN line, and as shown in FIG. 20B, the data on the first channel CH1 of the PHS is inserted into bits 0 through 3 (channel 1) of the data which flows into the ISDN line, and the data on the second channel CH2 of the PHS is inserted into bits 4 through 7 (channel 2) of the data which flows into the ISDN line. This conveys which type of data is transmitted on which channel of the ISDN.

Upon receiving call set-up 1620, the CPU 1401 of the ISDN communication terminal 1103 causes the call set-up message analyzer 1406 to perform analysis. In a case where two-channel bundled communication is carried out, the CPU 1401 causes the data disassembler 1404 and data assembler 1405 to operate. The CPU 1401 then starts two-channel bundled PHS communication (S1709).

In a case where the definition information request 1605 arrives without the arrival of the second set-up request 1603 at step S1705, processing makes a transition to the wireless connection phase (S1710). The exchange from the definition information request 1605 to the additional information 1613 is carried out in the manner shown in FIG. 16 to establish a wireless link using one wireless channel. The CPU 1201 of the wired communication device 1101 then causes the call set-up message creation unit 1206 to create the usual ISDN call set-up message 1620 and transmit the message to the ISDN communication terminal 1103 (S1711). At this time a data classification sent by the PHS set-up request 1603 is sent by being inserted into the call set-up message 1620.

Upon receiving call set-up 1620, the CPU 1401 of the ISDN communication terminal 1103 causes the call set-up message analyzer 1406 to perform analysis. In a case where ordinary communication is carried out, the data classification is analyzed and a connection is made to the output path that conforms to the data classification (S1712).

As a result, it is possible to establish call set-up when two channels of the PHS perform communication on one channel of the ISDN. In addition, notification to this effect can be given to the ISDN communication terminal 1103. Further, in the wireless communication terminal 1102, different types of data sent using two channels of the PHS can be transmitted on one ISDN channel.

Operation in the wired communication device 1101 for a case where data is transmitted will now be described.

When communication starts at step S1801 in FIG. 18, it is determined whether two-channel bundled PHS communication is performed (S1802). If the decision rendered is "YES", the channel path used by the ISDN is connected (S1803) and the time slots of the data sent from the PHS are discriminated (S1804). In case of R1, T1 in FIG. 15C, the first channel of the PHS is connected to the ISDN (S1805). In case of R2, T2 in FIG. 15C (S1806), the second channel is connected to the ISDN (S1807). In all other cases the connection between the ISDN and the PHS is broken.

In terms of the ISDN line, and as shown in FIG. 20B, the data on the first channel CH1 of the PHS is inserted into bits 0 through 3 (channel 1) of the data which flows into the ISDN line, and the data on the second channel CH2 of the PHS is inserted into bits 4 through 7 (channel 2) of the data which flows into the ISDN line.

In a case where data on one channel of the PHS flows into the ISDN, the channel path used by the ISDN is connected (S1808). In case of R1, T1 in FIG. 15C, the first channel of the PHS is connected to the ISDN (S1809) and, as shown in FIG. 20A, the data of the first channel of the PHS is inserted into bits 0 through 3 (channel 1) of the data which flows into the ISDN line, and dummy bit data is inserted into bits 4 through 7 (channel 2) to effect matching of speeds (S1810)

As a result, the data on two channels of the PHS can be bundled together and transmitted on one channel of the ISDN.

Data reception by the ISDN communication terminal 1103 will be described next.

When communication starts at step S1901 in FIG. 19, it is determined whether two-channel bundled PHS communication is performed (S1902). If the decision rendered is "YES" and voice is transferred on the first channel and an image on the second channel, for example, then, as shown in FIG. 20B, the voice data is transmitted via the ISDN line upon being inserted into bits 0 through 3 and the image data is transmitted via the ISDN line upon being inserted into bits 4 through 7. Accordingly, the data is disassembled into data on a time-slot basis by the data disassembler 1404. In a case where a time slot is channel 1 (S1904), the path is connected to the voice data input/output unit 1408 and voice is output (S1905). In a case where a time slot is channel 2, the path is connected to the image data input/output unit 1409 and an image is output (S1906).

In case of communication by one PHS channel, speed matching is performed (S1907) and the dummy bits are removed by the data disassembler 1404 (S1908). If this communication is voice communication (S1909), the path is connected to the voice data input/output unit 1408 and voice is output (S1910). If the communication is image communication, the path is connected to the image data input/output unit 1409 and an image is output (S1911).

As a result, different types of data sent using two channels by PHS communication can be transmitted on one ISDN channel.

In the embodiment set forth above, the data sent on two PHS channels is of different types. However, data of the same type can be transmitted on two channels in the same manner. As a result, it is possible to achieve a transmission speed which is twice that of the prior art.

Thus, according to this embodiment, in a system wherein a wired communication device and a PHS data communication terminal perform PHS wireless communication using two channels simultaneously, communication can be carried out by bundling two PHS channels into one ISDN channel. Further, in the wired communication device, two PHS channels can be bundled and communication can be performed on one ISDN channel. This makes it possible to reduce communication charges in comparison with the case where communication is performed using one ISDN channel per PHS channel.

In a case where call set-up messages for different types of information transmission capabilities arrive from the PHS data terminal by utilizing two channels, the wired communication device transmits call set-up to the ISDN side as one item of unlimited digital information, whereby different types of data sent using two PHS channels can be transmitted on one ISDN channel.

Further, the wired communication device transmits data received from the first PHS channel by inserting the data in bits 0 through 3 and transmits data received from the second PHS channel by inserting this data in bits 4 through 7, in which dummy bits are originally inserted. This makes it possible to dispense with dummy bit insertion processing in speed matching when PHS communication and ISDN communication are linked. The result is simpler processing.

When the wired communication device performs call set-up with regard to another party's terminal in an ISDN, the fact that communication is being performed by bundling channels is communicated to the other party's terminal. As a result, it is possible to notify the other party's terminal connected to the ISDN of the fact that PHS data is being transmitted by bundling two channels.

Eighth Embodiment

An eighth embodiment will be described next.

The eighth embodiment relates to a wireless communication system comprising a master device accommodating a digital public line and having a wireless telephone interface to which a digital wireless device can be connected, and a slave device serving as a wireless device capable of being connected to the master device by a digital link. The embodiment will be described in regard to a method of transmitting a large quantity of data efficiently in this system in a case where the transmission capacity of the radio units of the master and slave devices is half that of the digital public line.

In this embodiment, in order for communication to be carried out between the master and slave devices, communication is performed using two channels. For communication between the master device and the digital public network, communication is performed using one channel. This embodiment provides a concrete method of performing transmission smoothly. Specifically, when communication is performed, call requests on two channels from the slave side are dealt with effectively and the data on two wireless communication channels is unified effectively into data on one channel based upon the public network, thereby enabling smooth transmission.

In this embodiment, the description will be premised on a system having a transmission speed of 32 kbps in which the standard of the wireless communication section is that of a digital cordless telephone or simple mobile telephone.

Figure 21:
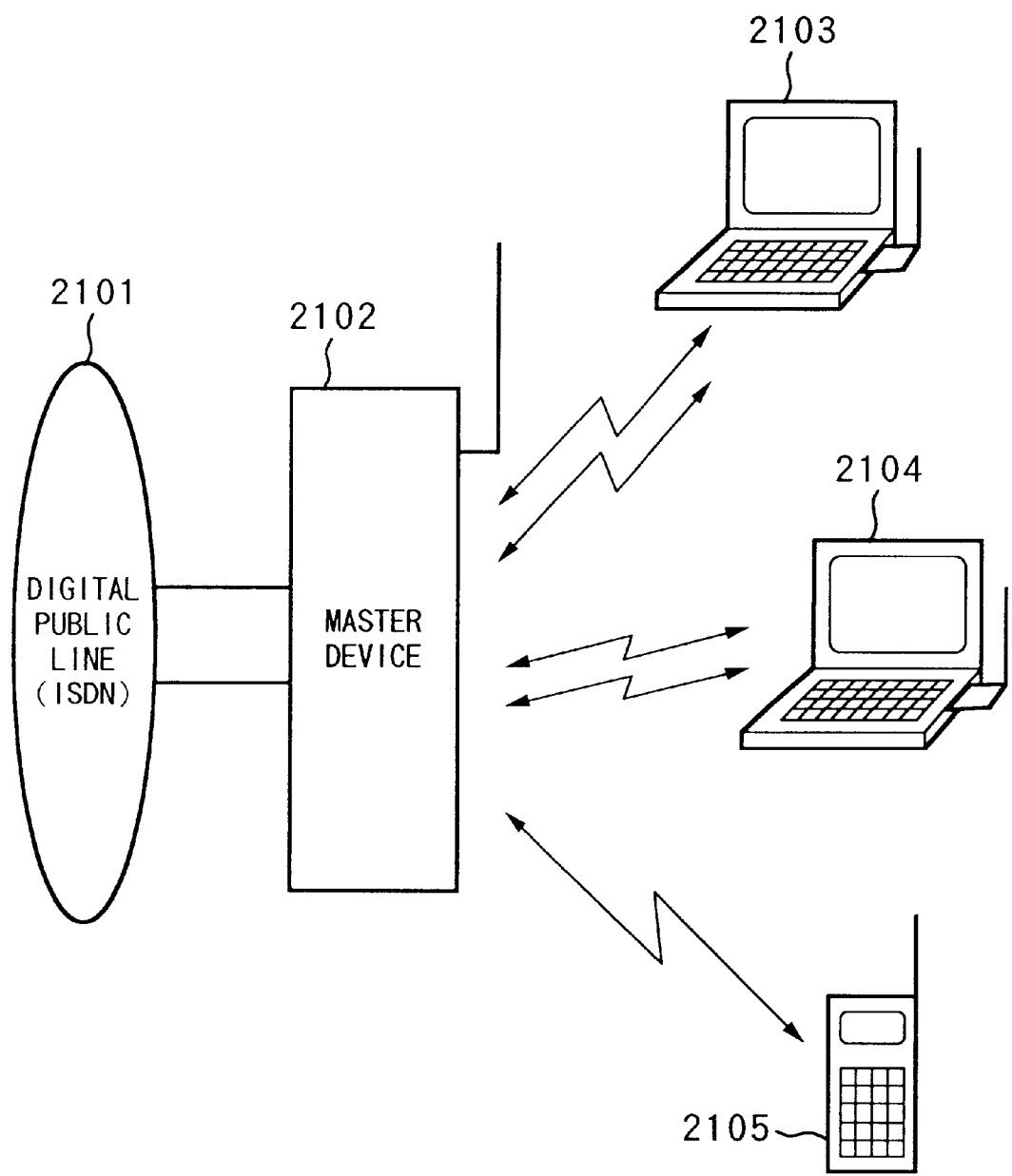
FIG. 21 is a diagram showing the configuration of a system according to an eighth embodiment of the present invention.

FIG. 21 is an explanatory view showing the configuration of a wireless communication system according to this embodiment.

This wireless communication system includes a master device 2102 accommodating a digital public line 2101 and having a wireless device interface to which at least two digital wireless devices can be connected, slave devices 2103, 2104 serving as wireless devices capable of being connected to the master device simultaneously by two wireless channels, and a slave device 2105 serving as a wireless telephone for performing voice communication by one wireless channel.

Figure 22:
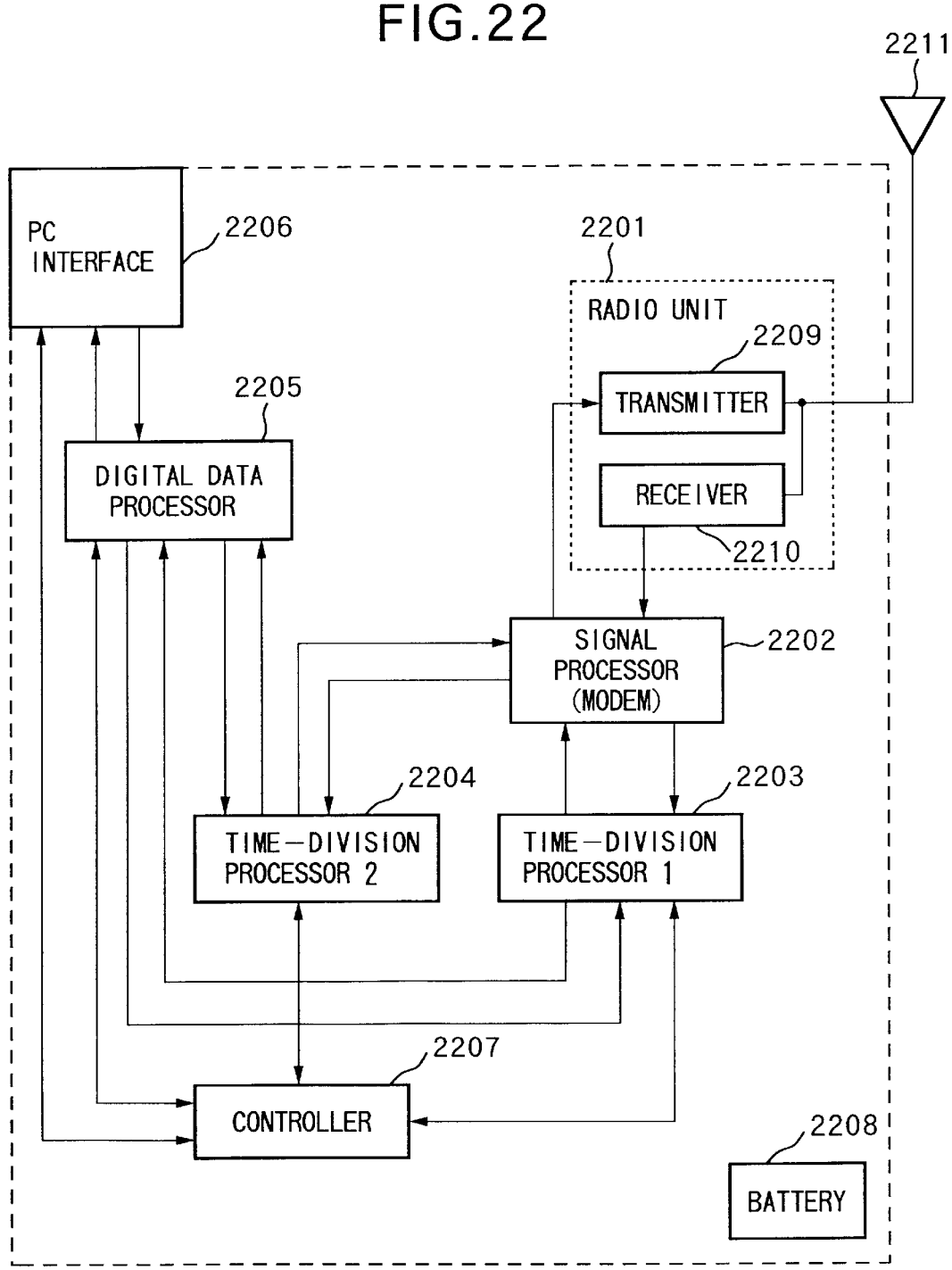
FIG. 22 is a block diagram showing a slave device in the wireless communication system of the eighth embodiment.

FIG. 22 is a block diagram showing the construction of the slave devices 2103, 2104 of the wireless communication system according to this embodiment. The construction of the wireless communication system will be described for a case where wireless communication is performed by connecting the slave devices to an information processing device (a personal computer).

As shown in FIG. 22, the slave device includes a radio unit 2201 for wireless transmission and reception. The radio unit 2201 comprises a transmitter 2209, a receiver 2210 and an antenna 2211. A signal processor 2202 detects a received signal and converts the signal to a digital signal. In addition, the signal processor 2202 performs modulation to wirelessly transmit a digital signal sent from first and second time-division processors 2203, 2204.

The first time-division processor 2203 performs one channel of communication processing by assembling data transmitted to the master device and control information from a controller 2207 in accordance with a time-division multiplexed communication scheme, disassembling a received time-division multiplexed signal into control information and data and sending the control information to the controller 2207.

The second time-division processor 2204 has a function similar to that of the first time-division processor 2203 and performs the communication processing of the second channel.

A digital data processor 2205 distributes the data from a PC interface 2206 to the time-division processors 2203, 2204, gathers data from the time-division processors 2203, 2204 and sends the gathered data to the PC interface 2206.

The PC interface 2206 sends and receives data to and from the information processor. The controller 2207 manages and controls the overall state of this wireless communication section in accordance with a program that has been stored in a memory (not shown). When two channels are used, information communicated by the two channels is added onto the dialed number by the controller 2207. A battery 2208 supplies the components of this wireless communication section with power.

Figure 23:
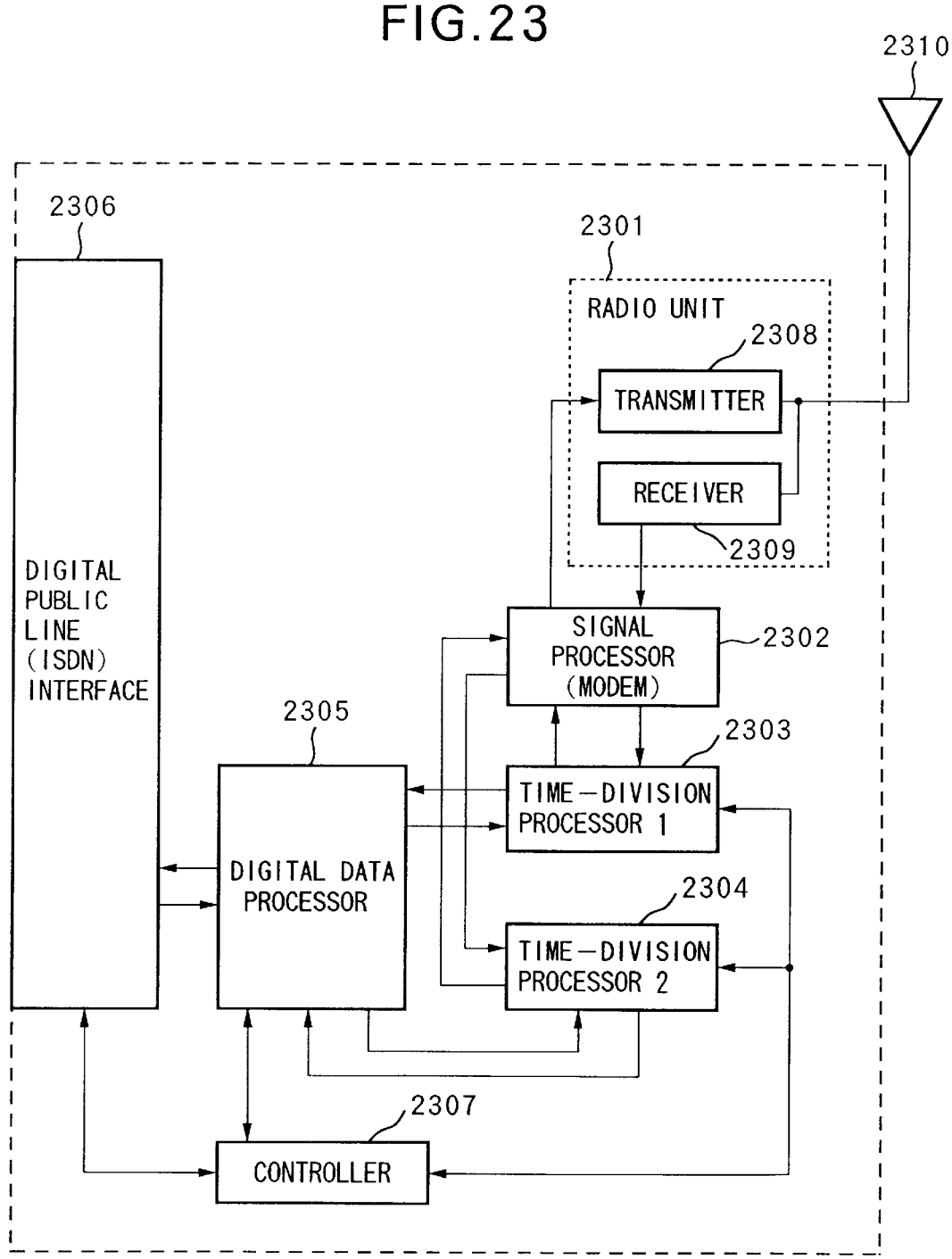
FIG. 23 is a block diagram showing a master device in the wireless communication system of the eighth embodiment.

FIG. 23 is a block diagram showing the construction of a master device in the wireless communication system of this embodiment.

As shown in FIG. 23, the master device includes a radio unit 2301 for wireless transmission and reception. The radio unit 2301 comprises a transmitter 2308, a receiver 2309 and an antenna 2310. A signal processor 2302 detects a received signal and converts the signal to digital signal. In addition, the signal processor 2202 performs modulation to wirelessly transmit a digital signal sent from first and second time-division processors 2303, 2304.

The first time-division processor 2303 performs one channel of communication processing by assembling data transmitted to the slave device, digitized voice data and control information from a controller 2307 in accordance with a time-division multiplexed communication scheme, disassembling a received time-division multiplexed signal into control information, data and digitized voice data and sending the control information to the controller 2307.

The second time-division processor 2304 has a function similar to that of the first time-division processor 2303 and performs the communication processing of the second channel.

A signal processor 2302, which executes signal processing that follows time-division processing, and the radio unit 2301 construct a wireless device interface to which two digital wireless devices are capable of being connected since signals to be processed are time-division multiplexed and can be processed by a single resource.

A digital data processor 2305 distributes the data from the digital public line interface 2306 to the time-division processors 2303, 2304, gathers data from the time-division processors 2303, 2304 and sends the gathered data to the digital public line interface 2306.

The digital public line interface 2306 accommodates a digital public line. The controller 2307 manages and controls the overall state of this wireless communication device in accordance with a program that has been stored in a memory (not shown). When two channels are used, information from a slave device to the effect that communication is performed on two channels is discriminated by the controller 2307.

Figure 24:
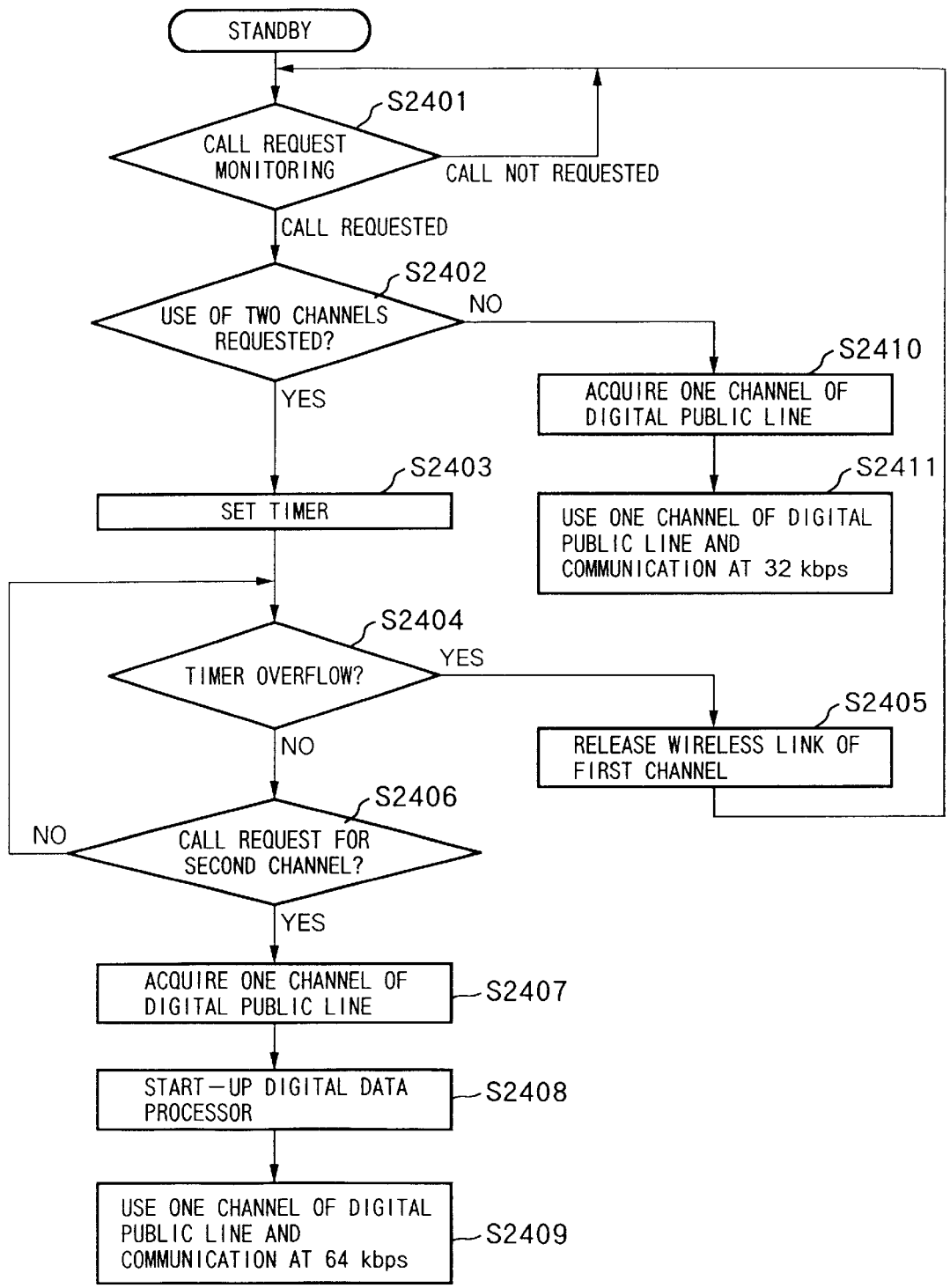
FIG. 24 is a flowchart showing the operation of the wireless communication system of the eighth embodiment.

FIG. 24 is a flowchart showing the basic operation of this embodiment.

When in the standby state, the master device performs monitoring to determine whether a call request has been issued by a slave device (S2401). The standby state continues if there no call request. If there is a call request, the master device examines the received call request signal and determines whether information requesting communication on two channels has been added onto the number specified by the communicating party (S2402).

In a case where two-channel communication has not been requested, the digital public line 2101 is acquired and the master and slave devices are wirelessly connected using one wireless channel (S2410). Data of a transmission rate of 32 kbps on one wireless channel is communicated using one channel of the digital public line.

If it is found at step S2402 that two-channel communication has been requested, a timer is set (S2403) and the master device waits for the call request of the second channel (S2406). In a case where the timer overflows before the call request arrives (S2404), the wireless link of the first channel is released (S2405) and the program returns to the standby state.

In a case where the call request of the second channel is received before the timer overflows, one channel of the digital public line 2101 is acquired and the master and slave devices are wirelessly connected using two wireless channels (S2407). The digital data processor 2305 is then started (S2408), data sent from the two wireless channels at the transmission speed of 32 kbps is unified and the unified data is transmitted at 64-kbps using one channel of the digital public line 2101.

Thus, it is possible for data on two wireless channels between the master and slave devices to be transmitted on one channel of the digital public line.

The eighth embodiment has been described in a form in which the communication unit of the slave device is connected to the information processor. However, the invention is applicable in similar fashion also to an arrangement in which the slave device and information processor are integrated into a single unit.

In accordance with this embodiment as described above, when data communicated by a slave device using two wireless channels is transmitted using one channel of a digital public line, information communicated by two wireless channels is added onto the dialed number and communicated to the master device. The master device does not perform an operation for effecting a connection to the digital public line until the connection request for the second channel arrives from the slave device. After call-set up requests for two channels have been received, the master device issues a connection request for one channel to the digital public line. As a result, two channels between the master and slave devices can be transmitted on one channel of the digital public line 1, thus making it possible to provide users with a high-speed data communication service.

Ninth Embodiment

A ninth embodiment will now be described. This embodiment relates to a facsimile communication system equipped with a digital wireless communication terminal and a digital wireless communication function.

Here 64-kbps data communication using PHS wireless data communication is provided by internally furnishing a facsimile apparatus having a PHS cell station (CS) function with a function for mapping two channels of PHS frame data to one channel of continuous data of a digital network or with a function for performing the reverse of this conversion.

Figure 25:
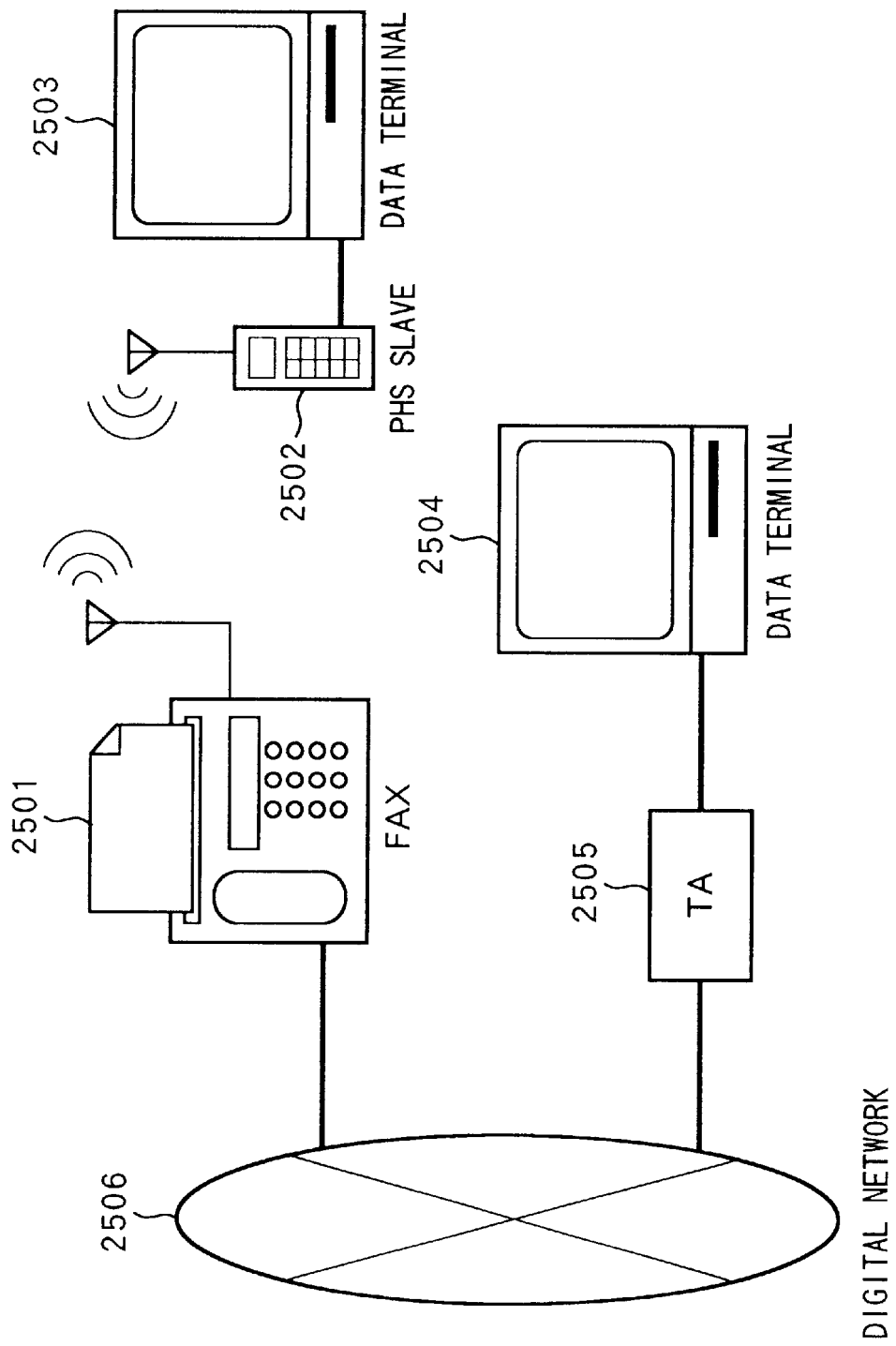
FIG. 25 is a diagram showing the configuration of a system according to a ninth embodiment of the present invention.

FIG. 25 is an explanatory view showing the configuration of a facsimile communication system according to this embodiment.

The facsimile communication system includes a digital network 2506 typified by an ISDN, a facsimile communication apparatus 2501 connected to the digital network 2506, a personal station 2502 typified by a PHS slave device which performs wireless communication by PHS with the facsimile communication apparatus 2501, a data terminal 2503 connected to the personal station 2502, another data terminal 2504, and a terminal adapter 2505 for connecting the data terminal 2504 to the digital network 2506.

Figure 26:
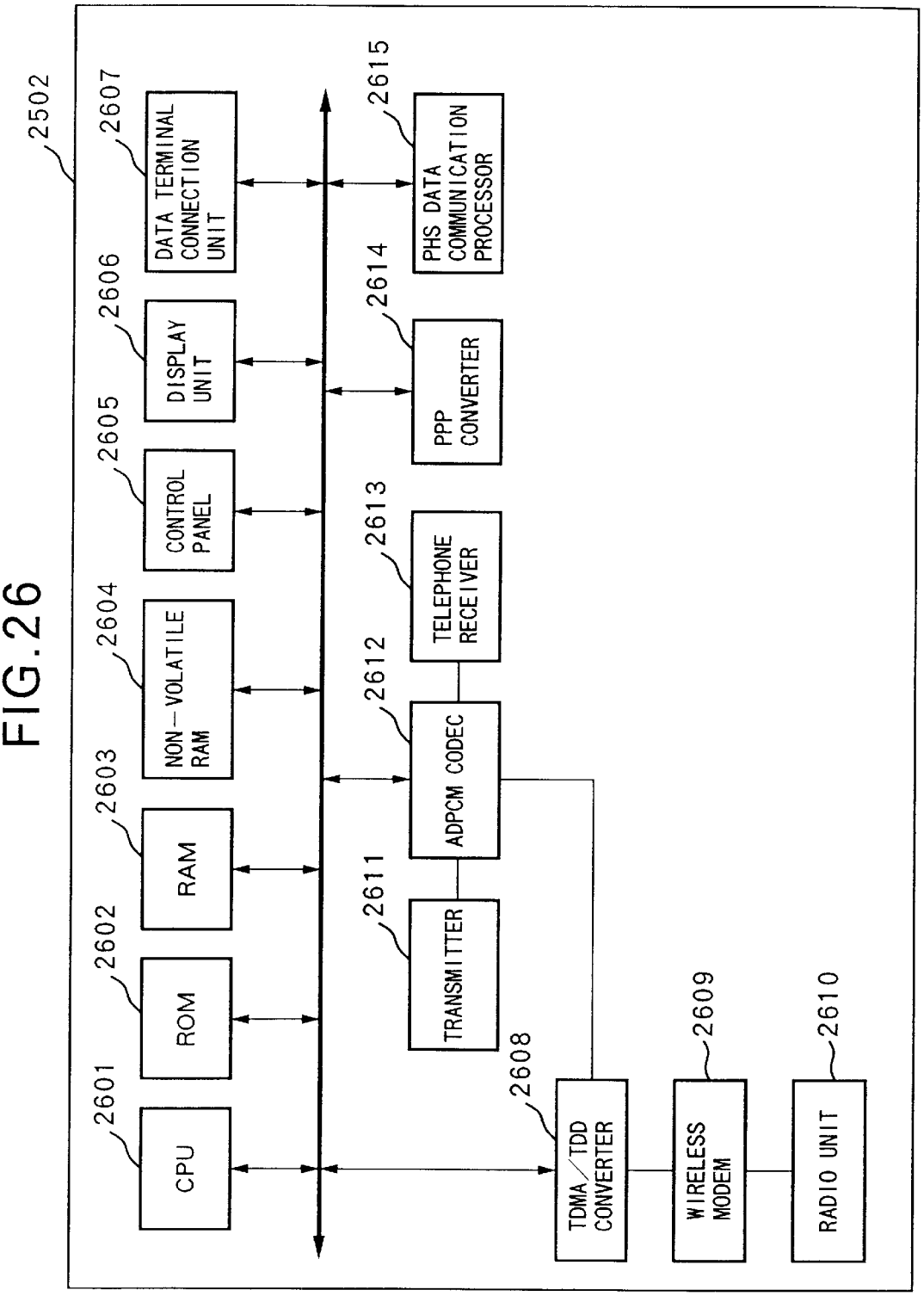
FIG. 26 is a block diagram showing a PHS slave device according to the ninth embodiment.

FIG. 26 is a block diagram showing the construction of the personal station 2502.

As shown in FIG. 26, the personal station 2502 has a CPU 2601 which, in accordance with a program that has been stored in a ROM 2602, controls the overall station, namely a RAM 2603, a non-volatile RAM 2604, a control panel 2605, a display unit 2606, a data terminal connection unit 2607, a TDMA/TDD (Time Division Multiple Access/Time Division Duplex) converter 2608, an ADPCM codec 2612, a PPP (point-to-point protocol) converter 2614 and a PHS data communication processor 1615.

The control panel 2605 has dialing keys, a hold key, a call key, mode keys for specifying operating mode and a registration key for single-touch registration.

The display unit 2606, which comprises a dot matrix LCD (liquid crystal display) and an LCD driver, presents various displays based upon control executed by the CPU 2601.

The data terminal connection unit 2607, which is a serial communication interface typified by the RS232C, is for performing an exchange of data between the connected data terminal and PHS slave device.

The TDMA/TDD converter 2608 converts the wireless communication protocol, voice and asynchronous burst data to a wireless communication frame format based upon RCR-STD-28, performs a conversion which is the reverse of this conversion, and controls send/receive timing.

A wireless modem 2609 is used in modulation/demodulation for carrying out 384-kbps wireless communication using 4/π shift QPSK (Quadrature Phase Shift Keying) modulation.

A radio unit 2610 sends and receives radio waves over a radio frequency band of 1.9 GHz, a carrier frequency interval of 4300 kHz and at an output power of less than 10 mW.

The ADPCM codec 2612 performs a conversion between an analog signal and 32-kbps data of an ADPCM voice coding scheme and inputs/outputs 64-kbps PCM data as an intermediate generated signal.

A transmitter 2611 such as a microphone and a telephone receiver 2613 such as a speaker are connected to the ADPCM codec 2612.

The PPP converter 2614 executes conversion processing for restoring, to the original communication data, asynchronous PPP-format data sent from the data terminal via the data terminal connection unit 2607, as well as processing for the reverse conversion.

The PHS data communication processor 1615 executes framing processing, synchronization processing and ARQ processing necessary for PHS data communication, thereby making PHS data communication possible.

Figure 27:
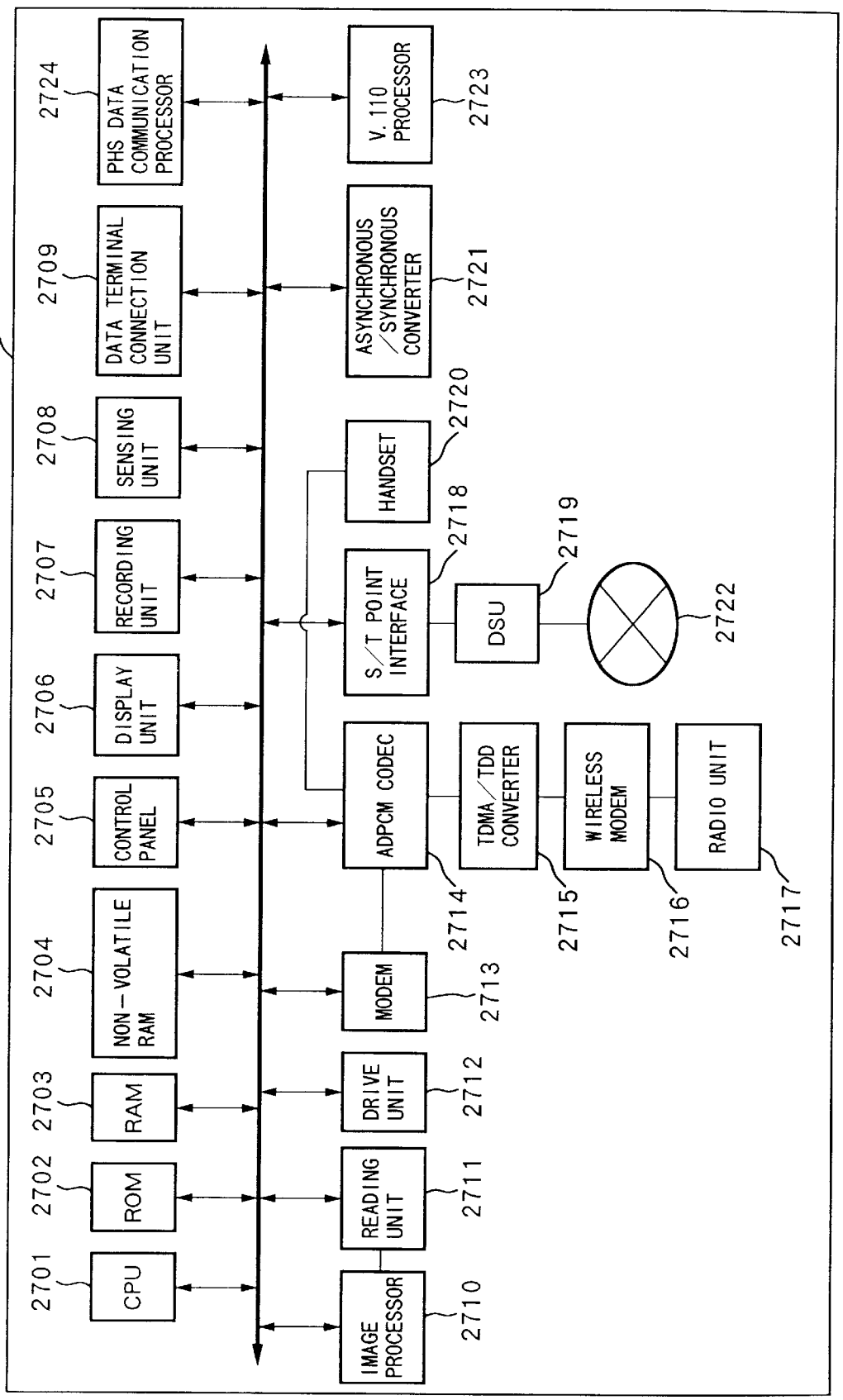
FIG. 27 is a block diagram showing a facsimile communication device according to the ninth embodiment.

FIG. 27 is a block diagram showing the construction of the facsimile communication apparatus 2501.

As shown in FIG. 27, the apparatus 2501 has a CPU 2701 which, in accordance with a program that has been stored in a ROM 2702, controls the overall apparatus, namely a RAM 2703, a non-volatile RAM 2704, a control panel 2705, a display unit 2706, a recording unit 2707, a sensing unit 2708, a data terminal connection unit 2709, an image processor 2710, a reading unit 2711, a drive unit 2712, a modem 2713, an ADPCM codec 2714, a TDMA/TDD converter 2715, a wireless modem 2716, a radio unit 2717, an S/T point interface 2718, a DSU (Digital Service Unit) 2719, a handset 2720, an asynchronous/synchronous converter 2721, a V.110 processor 2723 and a PHS data communication processor 2724.

The RAM 2703 stores binary image data read by the reading unit 2711 or binary data recorded by the recorder 2709, as well as binary data modulated by the modem 2713 and output by the digital network 2722.

The non-volatile RAM 2704, which is an SRAM backed up by a battery, stores data such as the telephone number specific to the apparatus and the user's name, the results of communication and a calling party data list.

The control panel 2705 has start keys for transmission and reception, etc., mode keys for specifying operating mode such as fine or standard modes in relation to a transmitted image, a copy key used at the time of copying, a stop key for stopping operation, a registration key for single-touch registration, etc. The display unit 2706 is constituted by an LCD and LCD driver.

The reading unit 2711, which comprises a CCD (charge-coupled device) or contact-type image sensor, a general-purpose IC (integrated circuit) and a binarizing circuit, binarizes data read using the CCD or contact sensor based upon control by the CPU 2701, and sends the binarized data to the RAM 2703 in successive fashion. The read image data can be sent to the image processor 2710 as well.

The recording unit 2707, which is constituted by a B4/A4 size thermal head or bubble-jet printer head and a general-purpose IC or the like, extracts recorded data, which has been stored in the RAM 2703, and outputs the data as a hard copy by control performed by the CPU 2701.

The drive 2712 includes a stepping motor for driving paper feed and discharge rollers in the reading unit 2711 and recording unit 2707, gears for transmitting the driving force of the motor, and a driver circuit for controlling the motor.

The modem 2713, which comprises V.34, V.32, V.32bis, V.17, V.29, V.27ter, V.23, V.21 (H,L) modems, caller-ID reception and caller-ID generation functions based upon V.23, and a clock generating circuit connected to these modems, modulates transmission data that has been stored in the RAM 2703 and outputs the modulated data to the network by control performed by the CPU 2701.

The modem 2713 demodulates a signal from the digital network 2722 and stores binary data in the RAM 2703. The digital network 2722 is a subscriber line connected to the DSU 2719.

The sensing unit 2708, which comprises a sensor for sensing width of recording paper, a sensor for sensing whether recording paper is present, a sensor for sensing width of the original and a sensor for sensing whether the original is present, senses the status of the original and recording paper under control performed by the CPU 2701.

The data terminal connection unit 2709, which is a bi-directional parallel interface in conformity with the IEEE-P1284 and/or a serial communication interface typified by RS232C, is for performing an exchange of data between the connected data terminal and the facsimile communication apparatus 2501. Further, the data terminal connection unit 2709 has a function for sensing whether a data terminal such as a personal computer has been connected to this interface.

A radio unit 2717 sends and receives radio waves over a radio frequency band of 1.9 GHz, a carrier frequency interval of 3000 kHz and an output power of less than 10 mW. The wireless modem 2716 is used in modulation/demodulation for carrying out 384-kbps wireless communication using 4/π shift QPSK modulation.

The TDMA/TDD converter 2715 converts the wireless communication protocol, voice and asynchronous burst data to a wireless communication frame format based upon RCR-STD-28, and performs a conversion which is the reverse this conversion.

The ADPCM codec 2714 performs a conversion between an analog signal and 32-kbps data of an ADPCM voice coding scheme and inputs/outputs 64-kbps PCM data as an intermediate generated signal.

The SIT point interface 2718 multiplexes/demultiplexes the D-channel data and B-channel data in the digital network between the DSU unit 2719 and the CPU 2701. The D-channel data, which is call control information of the digital network, is transferred between the SIT point interface 2718 and the RAM 2703.

Layer 3 data that has been assembled by the CPU 2701 is sent to the SIT point interface 2718 which, after adding on a layer 2 header, transmits the data in accordance with a timing decided by I.430. Layer 3 data from which the layer 2 header has been removed by the S/T point interface 2718 is transferred to the RAM 2703 and an interrupt is generated in relation to the CPU 2701.

B-channel data is input/output with respect to the DSU unit 2719 in a serial format in accordance with clock signals (64 kHz, 8 kHz) synchronized to the digital network. The earlier D-channel data is multiplexed and sent to the DSU unit 2719 in a predetermined format at the time of reception. Data received from the DSU unit 2719 is demultiplexed at the time of reception.

The DSU unit 2719 performs a format conversion between D-channel data and B-channel data in the digital network between the office exchange and the S/T point interface 2718 and, at the same time, controls call origination and detects incoming calls using a two-wire signal by which it is connected to the office exchange.

When a call is originated, the DSU unit 2719 changes the two-wire loop resistance over to 750 Ω in synchronization with a call origination request signal sent from the S/T point interface 2718 and notifies the office exchange of the origination request. When a call is terminated, the DSU unit 2719 notifies the S/T point interface 2718 of the incoming call based upon an incoming call notification signal transmitted from the office exchange.

At the end of the above-described origination/termination processing, the paths of the D and B channels are established between the office exchange and the S/T point interface 2718 and data is sent and received while the signal format conversion is carried out in the DSU unit 2719.

The handset 2720 outputs an analog voice signal from the ADPCM codec 2714 or enters an analog signal input to the ADPCM codec 2714.

The asynchronous/synchronous converter 2721 converts communication data to data having the HDLC format necessary at the time of LAPB communication in the digital network.

The PHS data communication processor 2724 executes framing processing, synchronization processing and re-transmission processing (when data is erroneous) necessary for PHS data communication, thereby making PHS data communication possible.

Figure 28:
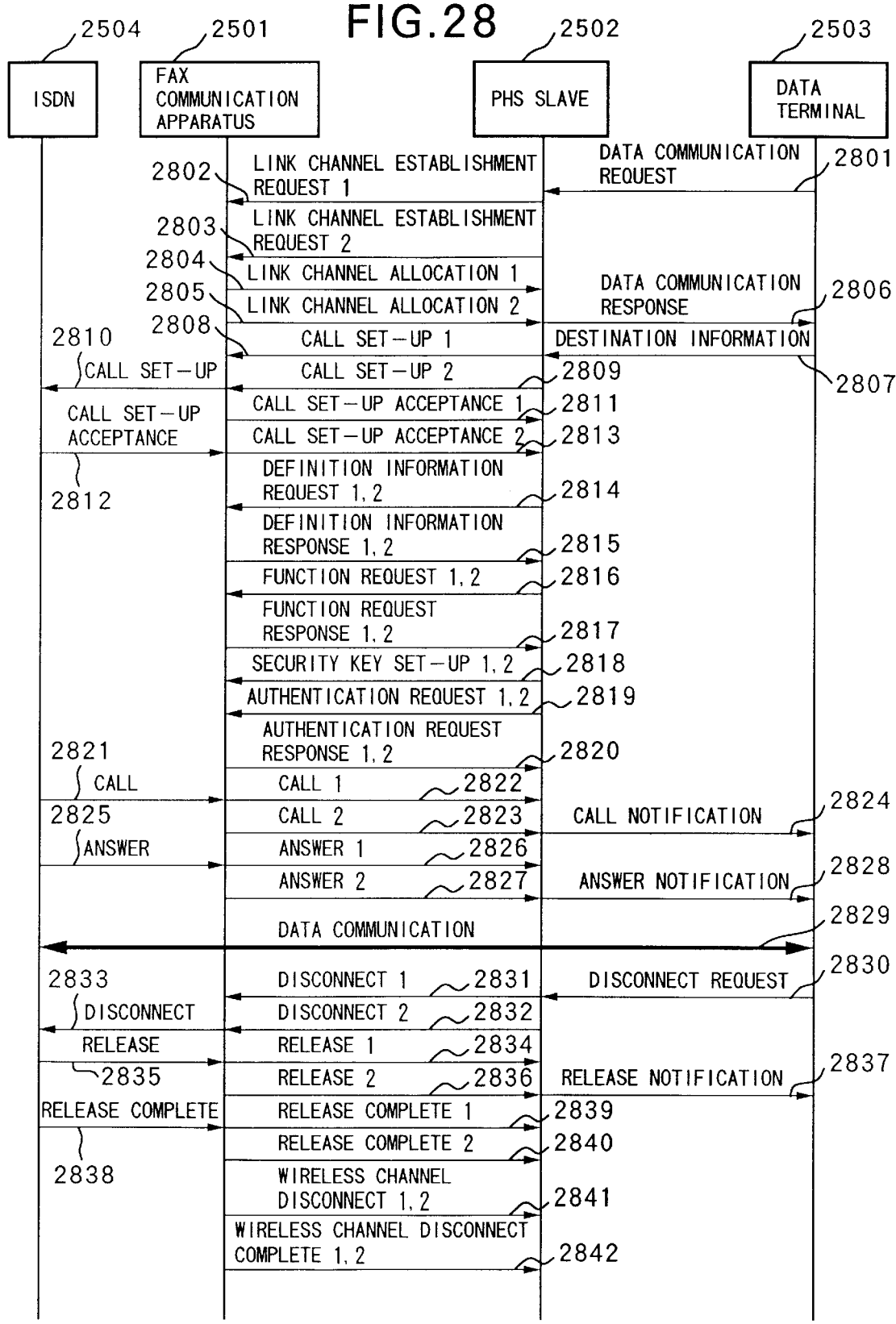
FIG. 28 is a data communication sequence according to the ninth embodiment.
Figure 29:
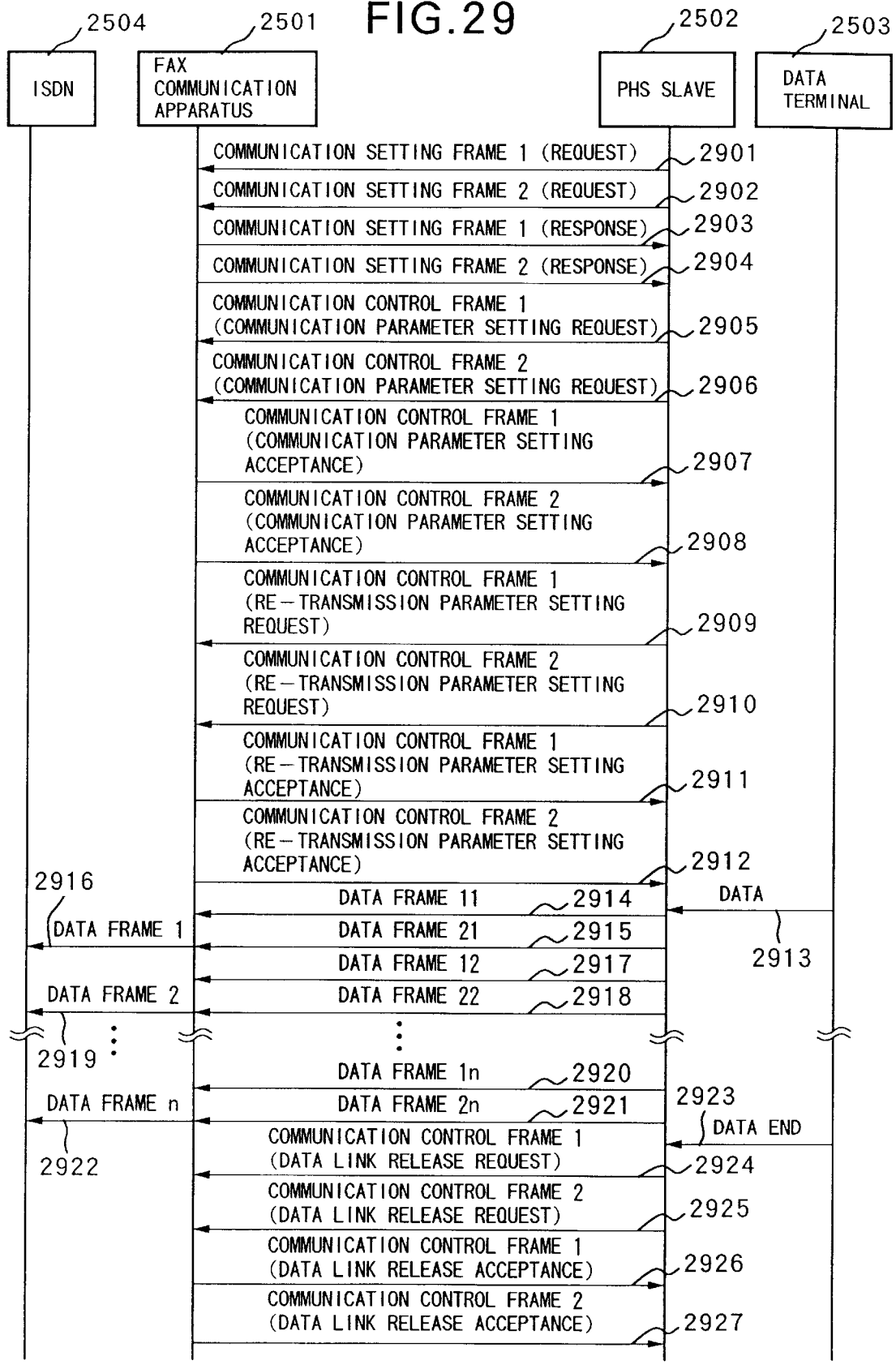
FIG. 29 is a data communication sequence according to the ninth embodiment.

FIG. 28 is an explanatory view illustrating the sequence of an exchange of control commands and messages exchanged among the facsimile communication apparatus 2501, PHS slave device 2502, data terminal 2503 and ISDN 2504 according to this embodiment. FIG. 29 is an explanatory view illustrating the detailed sequence of "data communication" indicated at 2829 in the sequence of FIG. 28.

This is an example in which the data terminal 2503 and PHS slave device 2502 are connected by wire and data communication is performed with the ISDN terminal 2506, which belongs to the other party, via the facsimile communication apparatus 2501 in accordance with the PHS data communication control procedure.

Figure 30:
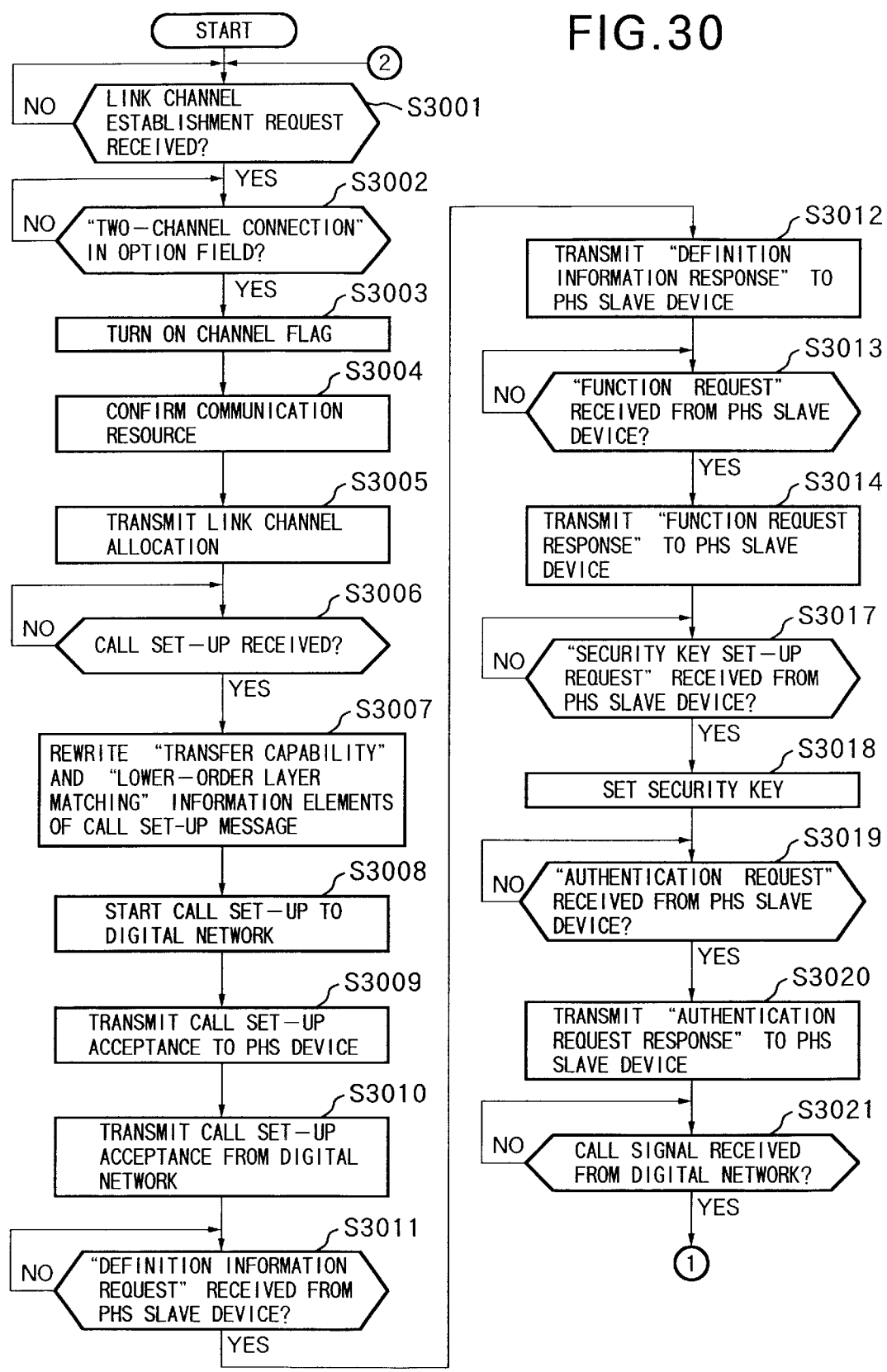
FIG. 30 is a flowchart showing the operation of the facsimile communication device according to the ninth embodiment.
Figure 31:
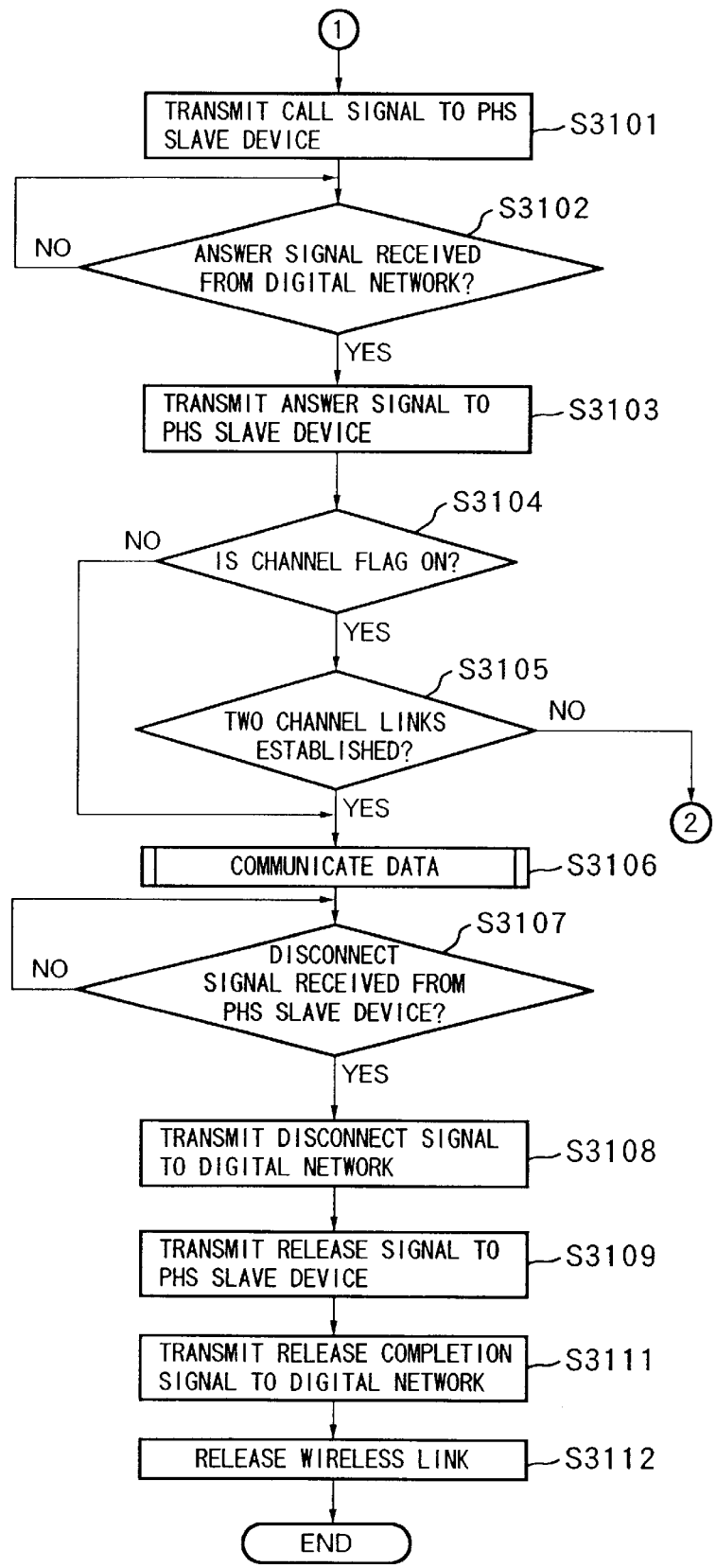
FIG. 31 is a flowchart showing the operation of the facsimile communication device according to the ninth embodiment.
Figure 32:
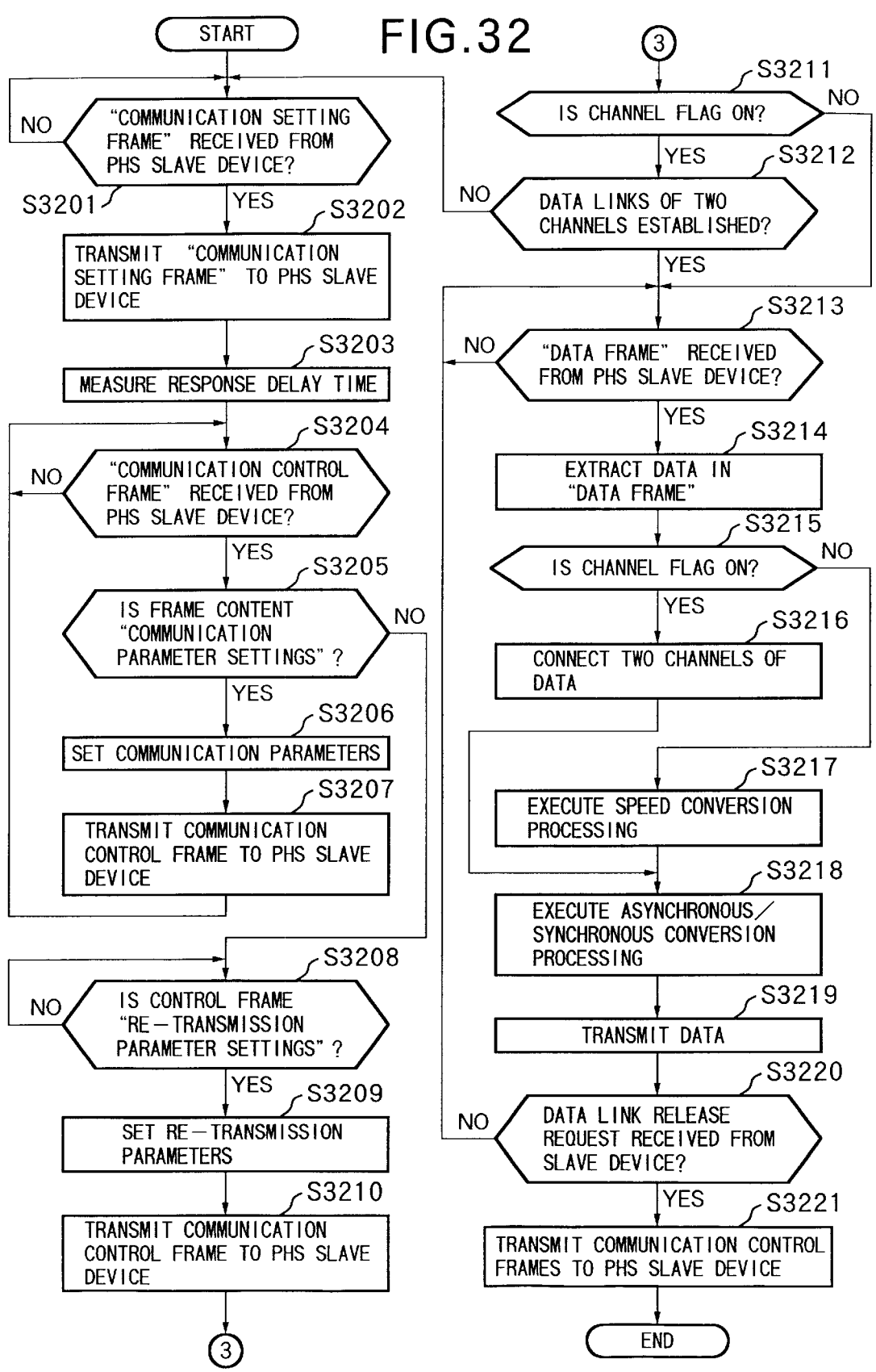
FIG. 32 is a flowchart showing the operation of the facsimile communication device according to the ninth embodiment.
Figure 33:
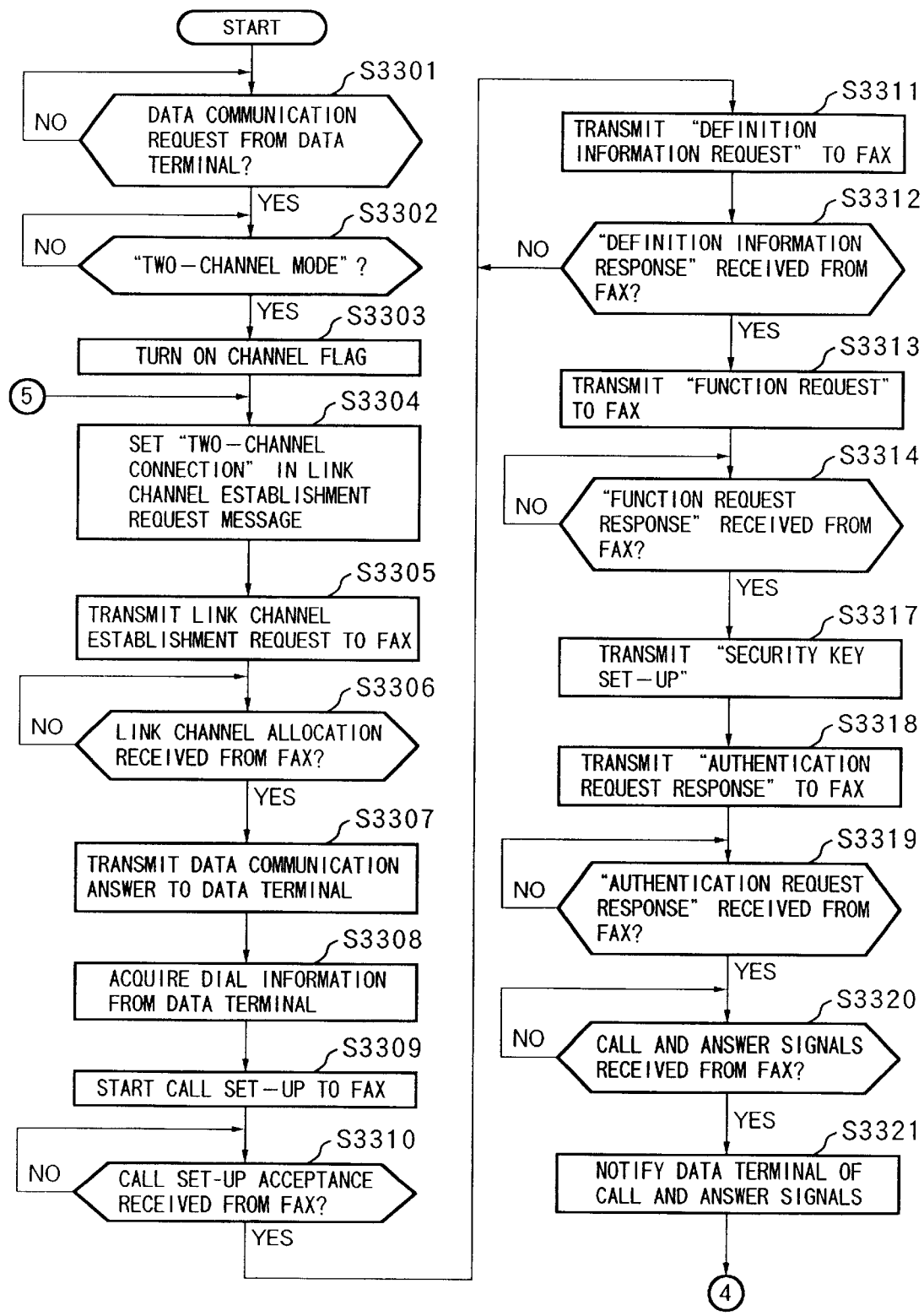
FIG. 33 is a flowchart showing the operation of the PHS slave device according to the ninth embodiment.
Figure 34:
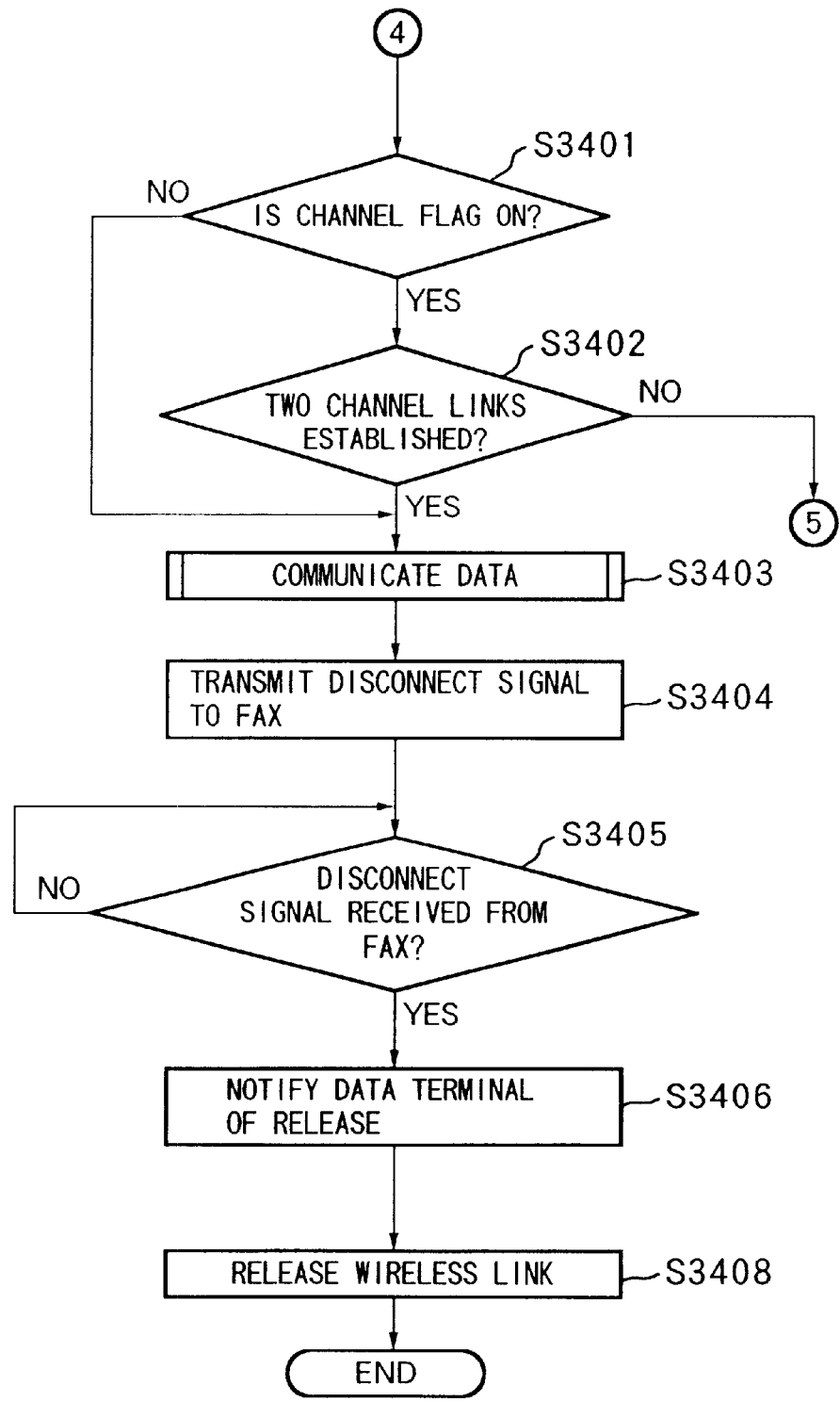
FIG. 34 is a flowchart showing the operation of the PHS slave device according to the ninth embodiment.
Figure 35:
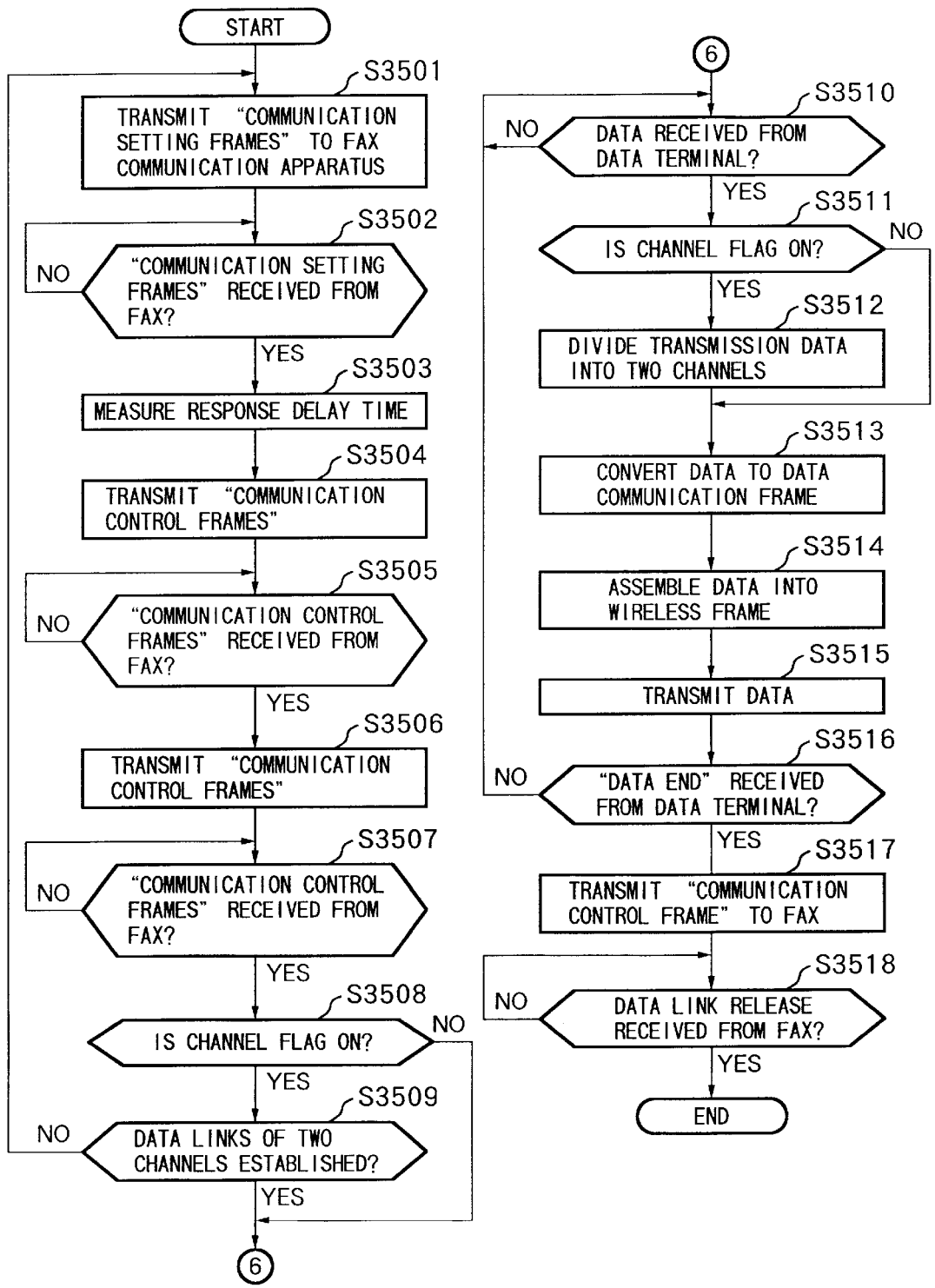
FIG. 35 is a flowchart showing the operation of the PHS slave device according to the ninth embodiment.

Further, FIGS. 30, 31 and 32 are flowcharts illustrating processing executed within the facsimile communication apparatus 2501 according to this embodiment. FIGS. 33, 34 and 35 are flowcharts illustrating processing executed with the PHS slave device 2502 according to this embodiment.

It should be noted that the communication sequence over the wireless interval and the flowchart described below are in accordance with RCR-STD-28 with the exception of the data communication portion.

When the data terminal 2503 transmits a data communication request (2801) to the PHS slave device 2502, the CPU 2601 of the PHS slave device 2502 transmits link channel establishment requests 1, 2 to the facsimile communication apparatus 2501.

If, upon receiving the link channel establishment requests 1, 2 (2802, 2803) from the PHS slave device 2502 (S3001) in FIG. 30, an indication specifying "two-channel connection" has been made in the option field (S3002), the CPU 2701 of the facsimile communication apparatus 2501 turns on a channel flag (S3003) indicating that the connection is made using two wireless channels. The CPU then confirms communication resources such as status of use of the wireless channels for the link channels and status of use of the line of the digital network 2506 (S3304). Link channel allocations 1, 2 (2804, 2805) are transmitted to the PHS slave device 2502 (3005).

Upon receiving the link channel allocations 1, 2 (2804, 2805), the CPU 2601 of the PHS slave device 2502 transmits a data communication response 2806 to the data terminal 2503. Upon receiving the data communication response 2806, the data terminal 2503 transmits destination information 2807 to the PHS slave device 2502. Upon receiving the destination information 2807, the CPU 2601 of the PHS slave device 2502 transmits call set-up messages 1, 2 (2808, 2809) to the facsimile communication apparatus 2501.

Upon receiving the call set-up messages 1, 2 (2808, 2809) from the PHS slave device 2502 (S3006), the CPU 2701 of the facsimile communication apparatus 2501 rewrites (S3007) the "transfer capability" information element and the "lower-order layer matching" information element, which have been written in the call set-up messages, starts call set-up (2810) for the call to the ISDN (S3008) and transmits call set-up acceptance messages 1 and 2 (2811 and 2813) to the PHS slave device 2502 (S3009).

When the CPU 2701 of the facsimile communication apparatus 2501, which has received the call set-up acceptance message (2812) from the ISDN (S3010), receives "definition information requests" 1 and 2 (2814) at S3011, "function requests" 1 and 2 (2816) at S3013 and "authorization requests" 1 and 2 (2819) at S3019 from the PHS slave device 2502, the CPU 2701 transmits corresponding "response" messages (S3012, S3014, S3020). If "security key set-up request" 1 and 2 (2818) is received (S3017), the CPU 2701 executes security key set-up processing (S3018).

If a call signal (2821) which notifies of the fact that a called user is being called and an answer signal (2825) which notifies of the fact that the called user has accepted the call are received from the ISDN (S3021, 3102), the CPU so informs the PHS slave device 2502 (S3101, S3103). Upon receiving call signals (2822, 2823), the CPU 2601 of the PHS slave device 2502 notifies the data terminal 2503 of the call. If answer signals (2826, 2827) are received, the CPU 2601 notifies (2828) the data terminal 2503 of the fact.

The CPU 2701 of the facsimile communication apparatus 2501 confirms (S3104) whether the channel flag set at step S3002 is ON. If the flag is ON, then the CPU 2701 confirms whether the wireless links of two channels have been established (S3105). If the answer is "YES", then the CPU starts data communication processing (S3106).

FIGS. 36A–36C are explanatory views showing the structure of frames according to this embodiment. FIG. 36A indicates the structure of a frame used in the PHS data communication section between the facsimile communication apparatus 2501 and PHS slave device 2502, and FIG. 36B indicates the structure of an HDLC frame used in ISDN data communication. Further, FIG. 36C shows an example of a method in which a data frame accepted by PHS data communication is mapped to an HDLC frame.

A "communication setting frame", "communication control frame" and "data frame" used in the description below employ the frame of FIG. 36A. The frame of FIG. 36A is included in one slot of the PHS wireless frame. Alternatively, if the frame is too long to fit into one slot, it is assumed that the frame is sent/received upon being divided up into a plurality of slots.

The "communication setting frame" is used in mutual confirmation of protocol employed in data communication. The "communication control frame" is used in various types of control necessary for communication, such as control of communication frame length, control of the type of data compression scheme, control of re-transmission control information, setting of data links, etc. The "data frame" is used in sending and receiving communication data.

In the data communication step S3106, the CPU 2701 of the facsimile communication apparatus 2501, which has received communication setting frames 1 and 2 (2901, 2901) from the PHS slave device 2502 (S3201 of FIG. 32), verifies the "protocol used" in the frame and then transmits the communication setting frames (2903, 2904) (S3202).

Upon receiving the communication setting frames 2903, 2904, the PHS slave device 2502 sends the communication setting frames 1, 2 (2905, 2906) to the facsimile communication apparatus 2501.

It should be noted that a response delay is calculated using the time interval needed to send and receive these communication setting frames (S3203).

If the communication control frames 1 and 2 (4805, 4806) have been received (S3204) from the PHS slave device 2502 and the content that has been set in the communication control frames is a "communication parameter" (S3205), then the CPU 2701 of the facsimile communication apparatus 2501 reads in the message portion and sets the communication frame length, type of data compression and re-transmission control information, etc., in the PHS data communication processor 2724 (S3206), after which the CPU transmits (S3207) communication control frames 1 and 2 (2907, 2908) set to "acceptance".

If the content of the received communication control frames is "re-transmission setting" (2909, 2910) (S3208), then the CPU 2701 reads in the content, sets a response delay value, etc., in the PHS data communication processor 2724 (S3209) and then transmits the communication control frames (2911, 2912) for giving notification of "acceptance".

Further, it is determined whether the channel flag set at S3003 is ON (S3211). If the flag is "ON", then it is determined whether data links of two channels have been established (S3212). If it is confirmed that they have been established and, moreover, the data frame is subsequently received from the PHS slave device 2502 (S3213), then the PHS data communication processor 2724 extracts the communication data from the data frame (S3214). If the channel flag is "ON" (S3215), the two channels of extracted data are connected (S3216).

If the channel flag is found to be "OFF" at step S2152, the data that has been transmitted on one wireless channel is subjected to a speed conversion from 32 to 64 kbps by the V.110 processor 2723 (S3217). Thereafter, the conversion to the HDLC frame is carried out by the asynchronous/synchronous converter 2721 (S3218), after which data is transmitted from the S/T point interface 2718 to the ISDN via the DSU unit 2719 (S3219).

The foregoing processing is repeated. If communication control frames 1 and 2 (2924, 2925) in which the content is "data link release" are received from the PHS slave device 2502 (S3220), control frames (2926, 2927) which have been set to "acceptance" are transmitted (S3221).

Upon receiving disconnect messages 1 and 2 (2831, 2832) from the PHS slave device 2502 (S3107), the CPU 2701 of the facsimile communication apparatus 2501 requests the ISDN to disconnect the call (2833) (S3108) and transmits release messages 1 and 2 (2834, 2836) to the PHS slave device 2502 (S3109). The call with respect to the ISDN is released (S3111) and so is the wireless link with the PHS slave device 2502 (S3112).

FIGS. 33 and 34 are flowcharts showing processing executed in the PHS slave device 2502.

When the data terminal 2503 begins a data transmission operation using its application program, a data communication request (2801) is sent to the PHS slave device 2502 via the data terminal connection unit 2707.

Upon receiving the data communication request (S3301), the CPU 2601 of the PHS slave device 2502 determines whether the requested data communication requires two channels (S3302). If two channels are necessary, the CPU 2601 turns the channel flag "ON" (S3303), sets link channel establishment requests 1 and 2 (2802, 2803) to "two-channel connection" in order to secure a wireless channel for call set-up with the facsimile communication apparatus 2501 (S3304), and sends the requests to the facsimile communication apparatus 2501 (S3305).

If a message indicating that link channel allocation has been completed is received from the facsimile communication apparatus 2501 (S3306), the CPU 2601 of the PHS slave device 2502 allows the data terminal 2503 to begin communication (S3307). If dialing information (2807) regarding the other party is received from the data terminal 2503 (S3308), the CPU 2601 executes processing for call set-up (2808, 2809) in regard to the facsimile communication apparatus 2501.

When call set-up processing is finished and call set-up acceptance messages 1 and 2 (2811, 2813) are received from the facsimile communication apparatus 2501 (S3310), the PHS slave device 2502 exchanges definition information (2814, 2815), function information (2816, 2817), a security key set-up request (2818) and authentication information (2819, 2820) with the facsimile communication apparatus 2501 (S3311 to S3319). If call signals 1 and 2 (2822, 2823) and answer signals 1 and 2 (2826, 2827) are received from the facsimile communication apparatus 2501 (S3320), the data terminal 2503 is notified of the content (S3321). It is then determined whether the channel flag set at S3303 is "ON" (S3401). If the flag is found to be "ON" and, moreover, it is confirmed that a data link for two channels has been completed (S3402), data communication is started (S3403).

FIG. 35 is a flowchart showing the details of data communication (S3403) in FIG. 34.

The CPU 2601 of the PHS slave device 2502 transmits communication setting frames (2901, 2902) for notifying of "protocol used" to the facsimile communication apparatus 2501 (S3501) and waits for receipt of communication setting frames (2903, 3904), in which "acceptance" has been set as "type of negotiation", from the facsimile communication apparatus 2501 (S3502).

The CPU 2601 of the PHS slave device 2502 calculates response delay (S3503) using the time interval needed to send and receive the communication setting frames.

Next, communication control frames for notifying of communication parameters (2905, 2906) and re-transmission data (2909, 2910) are transmitted to the facsimile communication apparatus 2501 (S3504).

If communication control frames (2907, 2908, 2911, 2912) meaning "acceptance" corresponding to these communication control frames are received (S3505), the channel flag set at S3303 is checked. If the flag is "ON" (S3508), then it is determined whether data links for two channels have been completed (S3509).

The CPU 2601 of the PHS slave device 2502 waits for communication data from the data terminal 2503. If the data is received (S3510) and the channel flag is "ON" (S3511), then the CPU divides the transmission data into two frames (S3512) and assembles the data into a communication frame by the PHS data communication processor 2615 (S3515). After the data is assembled into a PHS wireless frame in the TDMA/TDD converter 2608 (S3514), the data 2914–2921 is transmitted to the facsimile communication apparatus 2501 (S3515).

The foregoing communication processing is repeated. If notification of end of data (2923) is received from the data terminal 2503 (S3516), the PHS slave device 2502 transmits communication control frames 1 and 2 (2924, 2925) meaning "data link release" to the facsimile communication apparatus 2501. If these are received (S3518), processing for "data communication" is terminated.

Next, the PHS slave device 2502 transmits disconnect signals 1 and 2 (2831, 2832) to the facsimile communication apparatus 2501 (S3404). Upon receiving release signals 1 and 2 (2834, 2836) from the facsimile communication apparatus 2501 (S3405), the PHS slave device 2502 notifies the data terminal 2503 of release (2837) of the call (S3406).

Finally, the CPU 2601 of the PHS slave device 2502 releases the wireless link with the facsimile communication apparatus 2501 (S3408) and terminates communication.

Thus, the foregoing embodiment is such that two channels of PHS frame data are mapped to one channel of continuous data of a digital network even in a case where data communication is performed between data terminals using a PHS data communication protocol. As a result, 64-kbps data communication by PHS data communication can be provided, and it is possible for the communication application of a data terminal produced with the transmission speed of an ISDN in mind to be used without any limitation in functionality.

In the seventh through ninth embodiments, processing has been described through which data is transmitted by converting data transmission by two channels of a PHS or the like to data transmission by one channel of a digital public network. If a certain communication device is performing data transmission by two channels of a PHS or the like and another communication device has requested communication, processing in which one of the two channels in use is released and allowed to be used by the communication device that has requested communication can be combined with the processing of any of these embodiments in a manner similar to that of the first embodiment.

The first through ninth embodiments have been described using a PHS telephone as an example of a digital cordless telephone. However, the present invention may be used in other digital cordless telephones in accordance the standards of the CT-2, DECT (Digital European Cordless Telephone) and UDPC (Universal Digital Portable Communications), etc.

Further, in the first through ninth embodiments, two 32-kbps data streams are bundled into one 64-kbps data stream. However, data streams having other transmission rates may be bundled into a 64-kbps data stream or a plurality of 32-kbps data streams may be bundled into a data stream having a transmission rate other than 64 kbps.

Further, data on wireless channels having a transmission speed other than 32 kbps may be bundled together, subjected to a speed conversion to obtain data having a transmission speed other than 64 kbps on the channel of a wired line and transmitted via a wired line.

If, even when the data on the wireless channels is bundled together, the transmission speed does not agree with the transmission speed of the wired line, it will suffice to perform the speed conversion using dummy bits.

Thus, in accordance with the present invention, the data on a plurality of wireless channels can be sent on a single wired channel.

In accordance with the present invention, data transmission is performed at a speed as high as possible employing a plurality of usable wireless channels during the time that another terminal is not using a wireless link. If it becomes necessary for the other terminal to use a wireless channel while this high-speed transmission is being performed, it is possible to release a wireless channel that is in use. As a result, wireless channels and public lines can be used efficiently.

Further, in accordance with the present invention, data is transmitted by converting data transmission by two wireless communication channels to data transmission by one channel of a digital network. This makes it possible to transmit data highly efficiently.

As many apparently widely different embodiments of the present invention can be made without departing from the spirit and scope thereof, it is to be understood that the invention is not limited to the specific embodiments thereof except as defined in the appended claims.

What is claimed is:

1. A communication system having a control apparatus connectable to a wired line, and a first wireless communication apparatus wirelessly connectable to the control apparatus, wherein said control apparatus comprises:

first wireless communication means for communicating data with the first wireless communication apparatus using plural N wireless channels of plural M ($M \geq N$) wireless channels;

first converting means for converting data on the plural N wireless channels received by said first wireless communication means to data for a wired channel; and wired communication means for communicating, via the wired channel of the wired line, the data obtained by the conversion performed by said first converting means, and said first wireless communication apparatus comprises:

second wireless communication means for communicating data with said control apparatus using plural N wireless channels of plural M wireless channels, wherein said first wireless communication means can release a number of N wireless channels which have been used for data communication for other communication, and said first converting means performs data conversion without changing said wired channel even if the number of wireless channels is released.

2. The system according to claim 1, wherein said control apparatus has control means for releasing some of the plural N wireless channels being used by said first wireless communication means if a call origination request is received from another communication apparatus when communication is being performed by said first wireless communication means and said wired communication means.

3. The system according to claim 2, wherein said control means uses the released channels for communication with said other communication apparatus.

4. The system according to claim 3, wherein when communication with said other communication apparatus is finished, said control means uses the wireless channels that were used for communication with said other communication apparatus for communication with said first wireless communication apparatus.

5. The system according to claim 2, wherein when the wireless channels are released, said control means transmits information, which notifies of a change in transmission speed of data communicated using said wired communication means, to said wired line.

6. The system according to claim 2, wherein said other communication apparatus is a second wireless communication apparatus with which said control apparatus is capable of wirelessly communicating.

7. The system according to claim 2, wherein said other communication apparatus is a communication apparatus capable of communicating via the wired line.

8. The system according to claim 1, wherein said first wireless communication apparatus has connecting means for connecting a data processing device that is capable of data communication, and said second wireless communication means communicates data received from said data processing device via said connecting means.

9. The system according to claim 1, wherein said first and second wireless communication means perform communication using two wireless channels of plural M wireless channels;
said first converting means converts data on two of the wireless channels to data on one channel; and
said wired communication means communicates the data, obtained by the conversion by said first converting means, on one channel.

10. The system according to claim 1, wherein said first wireless communication means is capable of communication by using a single wireless channel of plural M wireless channels, and said control apparatus determines the number of wireless channels in dependence upon a command from said first wireless communication apparatus.

11. The system according to claim 10, wherein the command is issued when said first wireless communication apparatus issues a call origination request to said control apparatus.

12. The system according to claim 11, wherein the command is included in information added onto dialing information transmitted when said first wireless communication apparatus issues the call origination request to said control apparatus.

13. A control apparatus, connectable to a wired line, capable of being wirelessly connected to a first wireless communication apparatus, comprising:
first wireless communication means for communicating data with the first wireless communication apparatus using plural N wireless channels of plural M (M≧N) wireless channels;
first converting means for converting data on the plural N wireless channels received by said first wireless communication means to data for a wired channel that the channel number differs from the number of wireless channels; and
wired communication means for communicating, via the wired channel of the wired line, the data obtained by the conversion performed by said first converting means, wherein said first wireless communication means can release a number of N wireless channels which have been used for data communication for other communication, and said first converting means performs data conversion without changing wired channels even if the number of wireless channels is released.

14. The apparatus according to claim 13, wherein said control apparatus has control means for releasing some of the plural N wireless channels being used by said first wireless communication means if a call origination request is received from another communication apparatus when communication is being performed by said first wireless communication means and said wired communication means.

15. The apparatus according to claim 14, wherein said control means uses the released channels for communication with said other communication apparatus.

16. The apparatus according to claim 15, wherein when communication with said other communication apparatus is finished, said control means uses the wireless channels that were used for communication with said other communication apparatus for communication with said first wireless communication apparatus.

17. The apparatus according to claim 14, wherein when the wireless channels are released, said control means transmits information, which notifies of a change in transmission speed of data communicated using said wired communication means, to said wired line.

18. The apparatus according to claim 14, wherein said other communication apparatus is a second wireless communication apparatus with which said control apparatus is capable of wirelessly communicating.

19. The apparatus according to claim 14, wherein said other communication apparatus is a communication apparatus capable of communicating via the wired line.

20. The apparatus according to claim 13, wherein said first wireless communication means performs communication using two wireless channels of plural M wireless channels;
said first converting means converts data on two of the wireless channels to data on one channel; and
said wired communication means communicates the data, obtained by the conversion by said first converting means, on one channel.

21. The apparatus according to claim 13, wherein said first wireless communication means is capable of communication by using a single wireless channel of plural M wireless channels, and said control apparatus determines the number of wireless channels in dependence upon a command from said first wireless communication apparatus.

22. The apparatus according to claim 21, wherein the command is issued when said first wireless communication apparatus issues a call origination request to said control apparatus.

23. The apparatus according to claim 22, wherein the command is included in information added onto dialing information transmitted when said first wireless communication apparatus issues the call origination request to said control apparatus.

24. A wireless communication apparatus, capable of wireless communication with a first communication apparatus, which performs communication with a second communication apparatus via wired channels, comprising;
wireless connection means for wirelessly connecting with said first communication apparatus via N wireless channels of plural P (P≧N) wireless channels, wherein said first communication apparatus performs communication via a wired channel; and wireless communication means for communicating data, which is communicated via the wired channel by said first communication apparatus, with said first communication apparatus via the N wireless channel, wherein said wireless connection means releases a number of N wireless channels connected to said first communication apparatus while said first communication apparatus is communicating data for other communication with said second communication apparatus via the wired channel, and said wireless communication means communicates data, which was communicated via the wired channel by said first communication apparatus, with said first communication apparatus via wireless channels that the wireless channels has been released.

25. The apparatus according to claim 24, wherein said wireless connection means releases some of the N wireless channels, which have been connected with said first communication apparatus, in accordance with a signal received from said first communication apparatus.

26. The apparatus according to claim 25, wherein said wireless connection means connects the released wireless channels again in accordance with the signal received from said first communication apparatus.

27. The apparatus according to claim 24, wherein said wireless communication apparatus has connecting means for connecting a data processing device that is capable of data communication, and said wireless communication means communicates data from said data processing device received via said connecting means.

28. The apparatus according to claim 24, wherein said wireless communication means performs communication using two wireless channels of plural P wireless channels; and said first communication apparatus converts data on two of the wireless channels to data on one channel and communicates with the data, obtained by the conversion, on one channel.

29. The apparatus according to claim 24, wherein said wireless communication apparatus transmits information for specifying the number of wireless channels for connecting with said first communication apparatus upon start of communication with said first communication apparatus.

30. The apparatus according to claim 29, wherein said information is added onto dialing information and transmitted.

31. A method of controlling a communication system having a control apparatus connectable to a wired line, and a first wireless communication apparatus wirelessly connectable to the control apparatus, wherein a method of controlling said control apparatus comprises:

a first wireless communication step of causing communication of data with the first wireless communication apparatus using plural N wireless channels of plural M (M≧N) wireless channels;

a first converting step of converting data on the plural N wireless channels received at said first wireless communication step to data for a wired channel; and a wired communication step of causing communication of data, via the wired channel of the wired line, obtained by the conversion performed at said first converting step, and a method of controlling said first wireless communication apparatus comprises:

a second wireless communication step of causing communication of data with said control apparatus using plural N wireless channels of plural M wireless channels, wherein the number of N wireless channels can be released at said first wireless communication step which have been used for data communication for other communication, and data conversion is performed at said first converting step without changing said wired channel even if the number of wireless channels is released.

32. A method of controlling a control apparatus, which is connectable to a wired line, capable of being wirelessly connected to a first wireless communication apparatus, comprising:

a first wireless communication step of causing communication of data with the first wireless communication apparatus using plural N wireless channels of plural M (M≧N) wireless channels;

a first converting step of converting data on the plural N wireless channels received at said first wireless communication step to data for a wired channel; and a wired communication step of causing communication of data, via the wired channel of the wired line, obtained by the conversion performed at said first converting step, wherein a number of N wireless channels can be released at said first wireless communication step which have been used for data communication for other communication, and data conversion is performed at said first converting step without changing said wired channel even if the number of wireless channels is released.

33. A method of controlling a wireless communication apparatus capable of wireless communication with a first communication apparatus, which performs communication with a second communication apparatus via wired channels, comprising;

a wireless connection step of wirelessly connecting with said first communication apparatus via N wireless channels of plural P (P≧N) wireless channels, wherein said first communication apparatus performs communication via a wired channel; and a wireless communication step of causing communication of data, which is communicated via the wired channel by said first communication apparatus, with said first communication apparatus via the N wireless channels, wherein a number of N wireless channels connected to said first communication apparatus is released at said wireless connection step while said first communication apparatus is communicating with said second communication apparatus via the wired channel which have been used for data communication for other communication, and said wireless communication step causes communication of data, which was communicated via the wired channel by said first communication apparatus, with said first communication apparatus via wireless channels that wireless channels has been released.

34. A program storage device readable by a machine, tangibly embodying a program of instructions executable by the machine to perform method steps for controlling a control apparatus, which is connectable to a wired line, capable of being wirelessly connected to a first wireless communication apparatus, said method comprising;

a first wireless communication step causing communication of data with the first wireless communication apparatus using plural N wireless channels of plural M (M≧N) wireless channels;

a first converting step converting data on the plural N wireless channels received at said first wireless communication step to data for a wired channel; and a wired communication step causing communication of data, via the wired channel of the wired line, obtained by the conversion performed at said first converting step, wherein a number of N wireless channels can be released at said first wireless communication step which have been used for data communication for other communication, and data conversion is performed at said first converting step without changing said wired channel even if the number of wireless channels is released.

35. A program storage device readable by a machine, tangibly embodying a program of instructions executable by the machine to perform method steps for controlling a wireless communication apparatus capable of wireless communication with a first communication apparatus, which performs communication with a second communication apparatus via wired channels, said method comprising:

a wireless connection step wirelessly connecting with said first communication apparatus via N wireless channels of plural P (P≧N) wireless channels, wherein said first communication apparatus performs communication via a wired channel; and a wireless communication step causing communication of data, which is communicated via the wired channel by said first communication apparatus, with said first communication apparatus via the N wireless channels step, wherein a number of N wireless channels connected to said first communication apparatus is released at said wireless connection step while said first communication apparatus is communicating with said second communication apparatus via the wired channel which have been used for data communication for other communication, and said wireless communication step causes communication of data, which was communicated via the wired channel by said first communication apparatus, with said first communication apparatus via wireless channels that the wireless channels has been released.

* * * * *